US011623597B1

(12) United States Patent
Jost et al.

(10) Patent No.: US 11,623,597 B1
(45) Date of Patent: Apr. 11, 2023

(54) MULTIPURPOSE SEATBACK BLADDER SYSTEM FOR CRASH SAFETY AND LUMBAR SUPPORT

(71) Applicant: Zoox, Inc., Foster City, CA (US)

(72) Inventors: Markus Jost, San Mateo, CA (US); Nirmal Muralidharan, San Mateo, CA (US); Alexandre Nunes, San Carlos, CA (US); Haley Riesenberg, Redwood City, CA (US); Samantha Lynne Schoell, Redwood City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/589,579

(22) Filed: Jan. 31, 2022

(51) Int. Cl.
*B60R 21/207* (2006.01)
*B60N 2/66* (2006.01)

(52) U.S. Cl.
CPC ............ *B60R 21/207* (2013.01); *B60N 2/665* (2015.04)

(58) Field of Classification Search
None
See application file for complete search history.

(56) References Cited

U.S. PATENT DOCUMENTS

| | | |
|---|---|---|
| 3,000,020 A | 9/1961 | Lombard |
| 4,840,425 A * | 6/1989 | Noble .................... A47C 7/467 297/DIG. 3 |
| 5,580,124 A | 12/1996 | Dellanno |
| 5,769,489 A | 6/1998 | Dellanno |
| 6,055,473 A * | 4/2000 | Zwolinski .......... G01G 19/4142 701/45 |
| 6,820,930 B2 | 11/2004 | Dellanno |
| 7,090,292 B2 | 8/2006 | Dellanno |
| 7,270,377 B2 * | 9/2007 | Schmitz ................. B60N 2/643 297/452.32 |

(Continued)

FOREIGN PATENT DOCUMENTS

| | | | | |
|---|---|---|---|---|
| CN | 109552126 A | * | 4/2019 | ............... B60N 2/62 |
| CN | 112477716 A | * | 3/2021 | ............... B60N 2/22 |

(Continued)

OTHER PUBLICATIONS

Non Final Office Action dated Oct. 5, 2020 for U.S. Appl. No. 16/370,637, "Occupant Protection System Including Seat-Back Actuator System", Jost, 10 pages.

(Continued)

*Primary Examiner* — Faye M Fleming
(74) *Attorney, Agent, or Firm* — Lee & Hayes, P.C.

(57) ABSTRACT

A seat for a vehicle may include a seatback including one or more inflatable bladders that may be configured to provide adjustable lumbar support and to deploy in response to a triggering event signal indicative of a change of velocity, collision, or predicted collision event. One or more inflatable bladders may be configured to be independently controllable and configured to provide adjustable lumbar support at a region of the seatback during normal vehicle operation. Moreover, when at least a portion of the back of an occupant of the seat pushes against a front surface of the seatback due to the event, the one or more inflatable bladders may be configured to compress at least partially a comfort foam or comfort material in the seatback and expedite engagement of the energy absorbing material with the occupant's back.

19 Claims, 13 Drawing Sheets

(56) References Cited

U.S. PATENT DOCUMENTS

| | | | |
|---|---|---|---|
| 7,695,015 B2 | 4/2010 | Breed | |
| 7,850,203 B2 | 12/2010 | Niwa | |
| 8,630,772 B2 | 1/2014 | Ieda et al. | |
| 9,211,824 B2 * | 12/2015 | Arant | B60N 2/0232 |
| 9,527,421 B2 | 12/2016 | Hulway | |
| 9,713,975 B2 | 7/2017 | Berry et al. | |
| 9,889,771 B2 * | 2/2018 | Ohno | B60R 21/207 |
| 10,343,557 B2 | 7/2019 | Akaike et al. | |
| 10,647,286 B1 | 5/2020 | Dennis et al. | |
| 10,696,196 B2 | 6/2020 | Yetukuri et al. | |
| 11,076,698 B2 * | 8/2021 | Munechika | B60N 2/665 |
| 11,124,145 B2 | 9/2021 | Akoma | |
| 11,135,950 B2 * | 10/2021 | Migneco | A61N 1/40 |
| 11,364,828 B2 * | 6/2022 | Maloney | B60N 2/665 |
| 2004/0178616 A1 | 9/2004 | Yoshikawa | |
| 2005/0140190 A1 | 6/2005 | Kawashima | |
| 2005/0184491 A1 | 8/2005 | Itoga | |
| 2006/0202492 A1 | 9/2006 | Barvosa-Carter et al. | |
| 2011/0221247 A1 | 9/2011 | Hashimoto et al. | |
| 2013/0257119 A1 | 10/2013 | Roberts | |
| 2014/0167463 A1 * | 6/2014 | Sakata | B60N 2/914 297/284.3 |
| 2014/0316607 A1 | 10/2014 | Le et al. | |
| 2015/0375865 A1 | 12/2015 | Fischer et al. | |
| 2016/0325641 A1 | 11/2016 | Ohno et al. | |
| 2017/0008480 A1 * | 1/2017 | Ohno | B60N 2/99 |
| 2017/0291511 A1 | 10/2017 | Akaike et al. | |
| 2017/0349068 A1 | 12/2017 | Dry et al. | |
| 2018/0134191 A1 | 5/2018 | Ketels et al. | |
| 2018/0134192 A1 | 5/2018 | Wittenschlaeger et al. | |
| 2018/0170215 A1 | 6/2018 | Yetukuri et al. | |
| 2018/0170230 A1 * | 6/2018 | Onuma | B60N 2/914 |
| 2018/0319296 A1 | 11/2018 | Sasaki et al. | |
| 2019/0038229 A1 * | 2/2019 | Perraut | A61H 9/0078 |
| 2019/0126799 A1 * | 5/2019 | Lem | B60N 2/976 |
| 2019/0303729 A1 | 10/2019 | Gramenos et al. | |
| 2019/0344043 A1 | 11/2019 | Migneco et al. | |
| 2020/0062146 A1 | 2/2020 | Freienstein et al. | |
| 2020/0079245 A1 | 3/2020 | Rowe et al. | |
| 2020/0171985 A1 | 6/2020 | Yetukuri et al. | |
| 2020/0172040 A1 | 6/2020 | Cheng et al. | |
| 2020/0216006 A1 | 7/2020 | Jaradi et al. | |
| 2020/0223325 A1 | 7/2020 | Pinkelman et al. | |
| 2020/0282877 A1 | 9/2020 | Gajda et al. | |
| 2020/0298784 A1 | 9/2020 | Bonk | |
| 2020/0307433 A1 | 10/2020 | Nagasawa | |
| 2021/0122270 A1 | 4/2021 | Baer et al. | |
| 2021/0221263 A1 | 7/2021 | Jost et al. | |

FOREIGN PATENT DOCUMENTS

| | | | | |
|---|---|---|---|---|
| DE | 3334864 A * | 4/1985 | | A47C 4/54 |
| DE | 19938698 A1 | 2/2001 | | |
| DE | 102013207858 A1 * | 10/2013 | | B60N 2/0232 |
| DE | 102015217989 A1 * | 12/2016 | | A61H 9/00 |
| DE | 102016222465 A1 * | 6/2017 | | A47C 7/14 |
| DE | 102017129451 A1 * | 6/2018 | | B60N 2/0244 |
| GB | 2370222 A * | 6/2002 | | B60N 2/665 |
| WO | WO-2020245163 A1 * | 12/2020 | | B60N 2/665 |
| WO | WO2022012493 | 1/2022 | | |

OTHER PUBLICATIONS

Office Action for U.S. Appl. No. 16/370,637, dated Mar. 19, 2021, Jost, "Occupant Protection System Including Seat-Back Actuator System", 11 pages.

Office Action for U.S. Appl. No. 16/664,069, dated Jun. 9, 2021, Baer, "Occupant Protection System and Method Including Seatback" 9 pages.

PCT Search Report and Written Opinion dated Feb. 4, 2021 for PCT application No. PCT/US20/57179, 8 pages.

Chen, WO-2022012493-A1, English machine translation (Year 2020) 8 pages.

Office Action for U.S. Appl. No. 17/217,786, dated Dec. 6, 2022, Muralidharan, "Occupant Protection System and Method Including Seatback" 17 pages.

Office Action for U.S. Appl. No. 17/217,786, dated Jul. 27, 2022, Muralidharan, "Occupant Protection System and Method Including Seatback" 12 pages.

International Preliminary Report on Patentability for PCT Application No. PCT/US20/57179, dated May 5, 2022, 7 pages.

\* cited by examiner

US 11,623,597 B1

MULTIPURPOSE SEATBACK BLADDER SYSTEM FOR CRASH SAFETY AND LUMBAR SUPPORT

BACKGROUND

Conventional seatbelts and airbags attempt to reduce the effects of collisions by preventing or reducing the likelihood of the occupant contacting an interior surface and/or reducing the difference between the speed of the occupant and the speed of any surface the occupant contacts. However, conventional seatbelts and airbags may not provide sufficient protection to an occupant during certain collision conditions. Also, while these conventional devices can improve safety, they do not affect the comfort of a seat. Moreover, comfort foam may be used to improve softness of a seat to enhance rider experience. However, during a collision compression of the comfort foam can delay activation of energy absorption features of a seatback and thus may result in greater injury to a rider.

BRIEF DESCRIPTION OF THE DRAWINGS

The detailed description is described with reference to the accompanying figures. In the figures, the left-most digit(s) of a reference number identifies/identify the figure in which the reference number first appears. The same reference numbers in different figures indicate similar or identical items.

DETAILED DESCRIPTION

Figure 1:
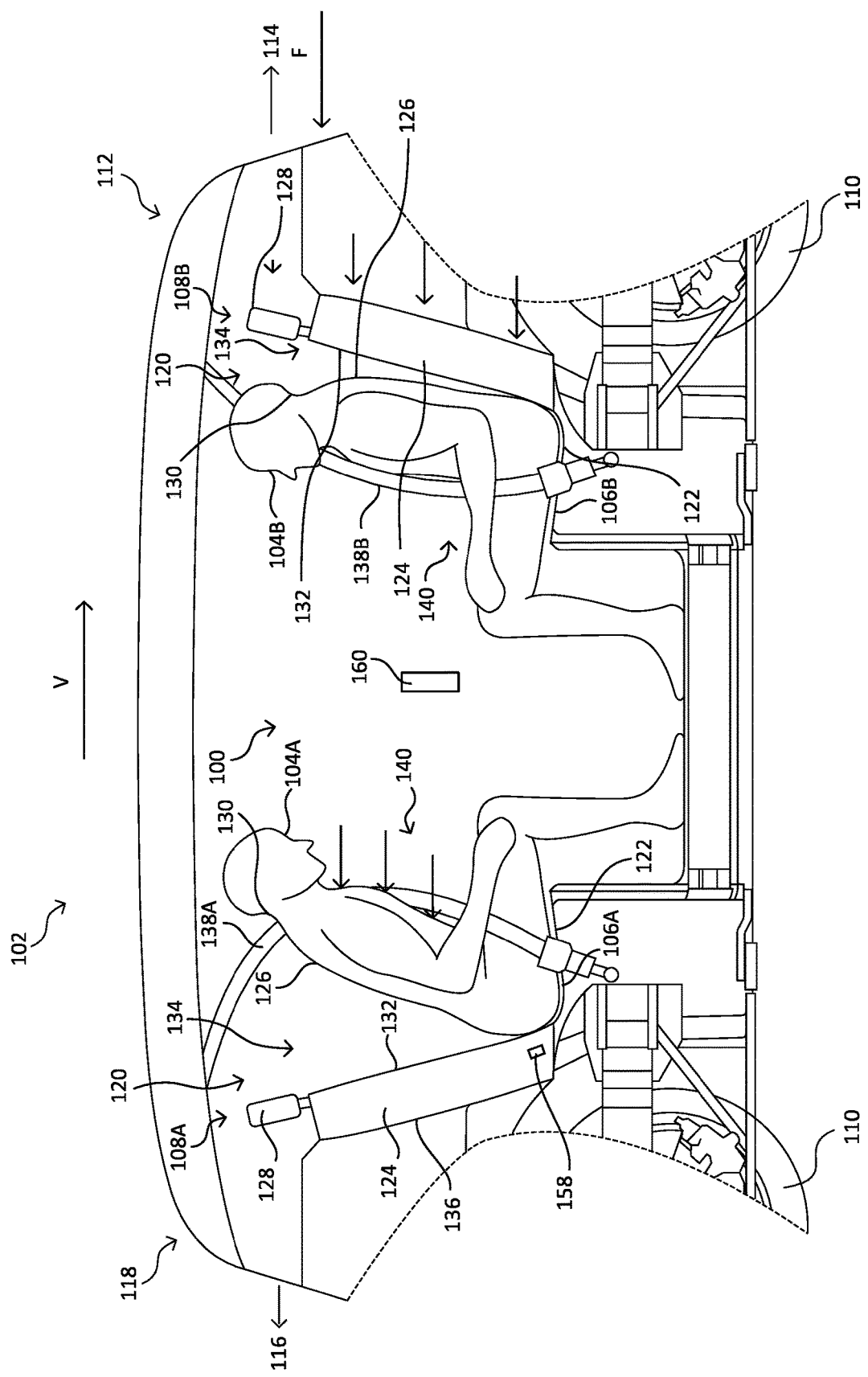
FIG. 1 is a cutaway side view of an example vehicle including an example multipurpose seatback bladder system during a change in velocity consistent with a collision.

As mentioned above, safety components of a vehicle may not always provide sufficient protection to an occupant during certain collisions. Also, conventional safety components are often designed only to engage during a particular occasion but otherwise are not configured to improve rider comfort during normal vehicle operation. With respect to safety, during a vehicle collision, injuries to an occupant of the vehicle may result from the occupant contacting a surface inside the vehicle during the collision. As a difference between the speed of the occupant and the speed of the surface the occupant contacts increases, the force to which the occupant is subjected also increases, thereby increasing the likelihood or severity of injuries to the occupant during the collision. While conventional safety components such as seatbelt and airbags can provide some degree of protection to a rider, their effectiveness is limited to certain collision scenarios (e.g., front facing collisions). Additionally, such conventional safety components do not enhance rider comfort during normal operation.

This application relates to a multipurpose seatback bladder system for crash safety and lumbar support adjustment for rider comfort and related methods.

In examples, the multipurpose seatback bladder system can be configured to assist with protecting a rear-facing occupant during a collision or rapid deceleration of a vehicle in which the occupant is traveling. As used herein, rear-facing occupant refers to an occupant who is facing in the opposite direction of travel of the vehicle and/or, in case of a change in velocity of the vehicle, a predicted change in velocity of the vehicle, a collision, or a predicted collision probability with an object in view of one or more objects based on sensor data received by one or more sensors, to an occupant facing in the opposite direction of the vehicle location subject to the collision or predicted collision (i.e. the occupant is facing such that the collision or predicted collision is behind the occupant).

In examples, the multipurpose seatback bladder system may be integrated in a seatback portion of a vehicle seat. In examples, the multipurpose seatback bladder system or a seatback with an integrated multipurpose seatback bladder system may be configured to provide an early energy absorption and thus lower a peak magnitude of the reaction forces experienced by the occupant during an event of a rear-facing collision or sudden change of velocity of the vehicle.

In examples, during normal vehicle operation, the multipurpose seatback bladder system or a seatback with an integrated multipurpose seatback bladder system may be configured to provide adjustable comfort to an occupant. In examples, the multipurpose seatback bladder system may be configured to provide a varying degree and/or height of lumbar support and thus improve rider comfort and experience during normal vehicle operation. The degree of lumbar support may vary in terms of the distance or extent that the lumbar support extends toward the occupant and/or in a firmness of the lumbar support.

For purposes of this description an event generally refers to an instance of one or more of an actual sudden change in velocity of the vehicle, a predicted sudden change in velocity of the vehicle, a collision, or a predicted collision or threshold probability of a predicted collision between the vehicle and an object based on sensor data received by one or more sensors. For purposes of this disclosure, normal vehicle operation refers to any time the vehicle is operated other than during an event that may be experienced by the vehicle. A triggering event generally refers to an event in response to which the vehicle system generates a signal or trigger signal. In examples, the event may refer to instances in which the occupant faces away from or in the opposite direction of travel of the vehicle or point of contact during a collision or predicted collision. For example, when an occupant is seated facing a direction opposite the direction of travel of the vehicle and a collision occurs with the leading end of the vehicle, such as, when the leading end of the vehicle collides with another vehicle or object and the back of the occupant is thrown into the seatback of the seat in which the occupant is sitting. Similarly, in examples, when a vehicle is involved in a collision or predicted collision with an object behind the seat occupied by the occupant independent of the direction of travel of the vehicle, for example in a rear end collision and the back of the occupant is or would be thrown into the seatback of the seat in which the occupant is sitting. As the difference between the speed of the occupant and the speed of the seatback increases, so does the force imparted to the occupant, thereby increasing the likelihood or severity of injury to the occupant during the collision.

In examples, the multipurpose seatback bladder system integrated in a seatback may include a set of inflatable bladders or other expandable structures configured to modify a stiffness of a front portion of the seatback and/or to fill a space between the seatback and a back of the occupant. In examples, the multipurpose seatback bladder system may be configured to reversibly modify a stiffness of a front portion of the seatback and/or to reversibly fill a space between the seatback and a back of the occupant at a localized area such as the lumbar region during normal vehicle operation, while also be configured to modify a stiffness of a front portion of the seatback and/or to fill a space between the seatback and a back of the occupant across an area extending from the pelvic region to the thoracic region during an event such as a collision or sudden change in velocity of the vehicle. In this manner the multipurpose seatback bladder system and/or the seatback with an integrated multipurpose seatback bladder system may be configured to provide adjustable comfort during normal vehicle operation and also couple to the occupant's back sooner and to absorb energy from (e.g., decelerate) the occupant over a longer ride down distance, thereby minimizing the magnitude of forces imparted to the occupant during an event such as a collision or predicted collision.

Individual seats of a vehicle generally include a seat base and a seatback as described in more detail later. The seatback portion provides a back support for an occupant riding in the vehicle. In providing such support, and to protect an occupant during an event such as a collision or sudden change in velocity, the seatback may be configured to absorb energy from the body of the occupant during an event.

Although in examples a seatback can include one or more energy absorbing materials able to absorb the energy force exerted by the body of the occupant against the seat during the collision, energy absorbing materials, may not provide for a comfortable surface during routine use of a seat. To effectively absorb energy, energy absorbing materials are typically stiff and hard to compress. To provide ride comfort, a seatback can include one or more layers of comfort foam and/or other comfort material (e.g., fabric, mesh, batting, leather, vinyl, etc.) over the one or more energy absorbing materials. As the name implies, comfort foam and/or other comfort material is a relatively soft material that can be easily compressed and thus provides for a more comfortable riding experience. Comfort foam and comfort materials may be made of compliant and/or elastomeric materials. In examples, one or more proximate or adjacent or consecutive layers or sections of comfort foam or comfort material may account for an aggregate total thickness ranging from 20 mm to 100 mm, in examples 20 mm to 25 mm. These ranges are only examples, and other thicknesses (within, greater than, or less than those specified) may be used. In examples, for improved comfort, thicker or more layers of comfort foam or comfort material can be used.

A drawback to using comfort foam or comfort material is that it may distance an occupant from an energy absorbing material sufficient to mitigate injuries to a user. In the case of an event, the comfort foam or comfort material can provide little to no energy absorption to mitigate injuries. As such, the seatback may not exhibit substantial energy absorption until the energy absorbing material is engaged. This may not occur until the comfort foam or comfort material has been at least partially compressed. Compression of the comfort foam or comfort material delays engagement of the energy absorbing material. The longer it takes for the body of the occupant to engage the energy absorbing material, the shorter the distance that is available to decelerate the occupant and, consequently, the greater the magnitude of a peak reaction force experienced by the occupant may be. Thus, the delay to engage the energy absorbing material due to the compression of the comfort foam or comfort material can result in a shorter time and distance over which to decelerate the occupant, which can result in higher reaction forces experienced by the occupant. This can lead to injury to the occupant. As such, it is desirable to minimize the time it takes to engage the back of the occupant to the energy absorbing material during an event.

Moreover, while comfort foam can improve rider comfort, it may not be sufficient in every situation. In examples, rider comfort may depend on the amount of contact between the seatback and the back of the occupant. In examples, increased contact may lead to added support and thus increased comfort. In examples, the seatback profile might be such that the degree of contact between the seatback and the back of an occupant may vary with each occupant. Accordingly, it is desirable to also implement a system that can affect the degree of contact between the seatback and the back of an occupant by adjusting a stiffness and/or contour of the seatback during normal vehicle operation.

In examples, the multipurpose seatback bladder system as described herein can be at least a dual purpose system that may be configured to provide adjustable and reversible support in the lumbar region to improve rider comfort as well as be configured to deploy one or more inflatable bladders to stiffen at least a portion of the seatback by pre-compressing at least a portion of the comfort foam or comfort material overlaying the energy absorbing material in an event such as a collision or sudden change in velocity of the vehicle. By pre-compressing at least a portion of the comfort foam or comfort material during or just prior to an event, the comfort foam can act as an energy absorbing material sufficient to protect an occupant and/or the energy absorbing material can be engaged earlier and thus commence energy absorption earlier. In doing so, the system may be able to reduce the peak magnitude of the reaction forces, such as force due to acceleration, and/or compression force, experienced by an occupant. This can lower the risk of injury to an occupant.

In examples, the multipurpose seatback bladder system as described herein may be implemented in a seatback of any vehicle seat without having to increase vehicle stroke, seatback dimensions, or other vehicle physical dimensions.

In some examples, the seatback may include one or more features configured to provide adjustable and reversable lumbar support and may also include materials and/or a construction configured to rapidly compress the comfort foam or comfort material in the seatback and/or subject the back of the occupant to a relatively reduced and/or constant reaction force as at least portions of the back of the occupant compresses the seatback during deceleration of the occupant, for example. In some examples, the adjustable and reversable lumbar support and the relatively reduced and/or constant reaction force may be provided by deploying one or more inflatable bladders that compress at least a portion of the comfort foam or comfort material that may be provided on a portion of the seatback that faces the back of the occupant. In some examples, different zones of the seatback may have different inflatable bladders that can be deployed simultaneously, concurrently, or at different time intervals and can provide the same or different stiffnesses tailored for different parts of the back of the occupant, such as the pelvic region, the lumbar region, the thoracic region, and/or the cervical region. In examples, at least one or more inflatable bladders in the lumbar region may be reversibly deployed so that stiffness adjustments may be varied during normal vehicle operation by one or more occupants. In some examples, the multipurpose seatback bladder system may actively increase pressure associated with the seatback to more rapidly compress at least a comfort foam or comfort material in the seatback and thus accelerates engagement of the energy absorbent material. Such configurations may be useful for enhancing protection of an occupant during certain types of collisions involving the vehicle and/or during rapid deceleration of the vehicle.

In some instances, the vehicle may include a planning system, a safety system, a lumbar support adjustment system, or any combination thereof that can receive a command input from a user and/or determine an event such as a change in velocity of the vehicle, a predicted change in velocity of the vehicle, a collision, or a predicted collision probability in view of one or more objects based on sensor data received by one or more sensors. In examples, the planning system, safety system, and/or lumbar support adjustment system, can generate a corresponding trigger signal based on either a command input and/or a determined event that is received by the multipurpose seatback bladder system to deploy and/or adjust support in the lumbar region and/or to deploy one or more inflatable bladders to stiffen at least a portion of the seatback by pre-compressing at least a portion of the comfort foam or comfort material overlaying the energy absorbing material in the event of a collision or sudden change in velocity of the vehicle.

In examples, the command input may be sent via a user interface provided in the vehicle and/or by way of a remote device. In examples, a user interface provided in the vehicle may include a dial, lever, touchscreen, button, keyboard, voice command microphone receiver or any similar input device. In examples, a remote device for inputting the command may include a remote control, a portable computing device, a remote computing system, or any like devices. In examples, a remove device may include a smart device or portable personal computing device such as a smart phone, palm pilot, laptop, or any smart wearable device such as a smart watch. In examples, an application may be downloaded on the smart device, portable personal computing device, or remote computer that is configured to communicate with the vehicle system and send and receive information and commands. In examples, an application may be designed to allow a user to select the desired degree of lumbar support.

In examples, the sensor data indicative of an event may include data associated with the vehicle and/or one or more objects in the environment of the vehicle. For example, the sensor data may include information associated with physical characteristics, a location, and/or a movement associated with the vehicle and the object(s). Additional information associated with the object(s) may be determined based on the sensor data, such as a position, a velocity, an acceleration, a direction, a size, a shape, a type of the object, etc. Based on the sensor data, trajectories of the vehicle and/or the object may be determined for use in determining the collision probability. Generally, the probability may represent a likelihood, or risk, of the change in velocity of the vehicle, a predicted change in velocity of the vehicle, a collision, or a predicted collision occurring. In most circumstances, the vehicle can maneuver to safely avoid the collision. However, in instances where avoidance is impossible and the probability of a change in velocity of the vehicle, a predicted change in velocity of the vehicle, a collision, or a predicted collision is greater than a threshold probability, the planning system and/or safety system may determine that a change in velocity of the vehicle or a collision is predicted to occur. In some instances, whether the change in velocity or the collision is predicted to occur may be based at least in part on determining that the change in velocity or collision is imminent (e.g., within a certain amount of time). Based on this determination, the planning system and/or safety system may communicate with other system(s) of the vehicle such as the multipurpose seatback bladder system to cause deployment of one or more inflatable bladders to protect the occupant. In some instances, engagement of the multipurpose seatback bladder system to deploy one or more inflatable bladders in case of an event may be performed prior to a change in velocity or a collision (e.g., pre-collision), during a change in velocity, during a collision, and/or after a change in velocity or collision (e.g., post-collision). In instances where the multipurpose seatback bladder system may be engaged to cause deployment of one or more inflatable bladders prior to the change in velocity or collision, the safety system and/or the planning system may communicate with systems of the vehicle in advance and with enough time to permit engagement of the multipurpose seatback bladder system and/or other safety device.

This disclosure is generally directed to apparatuses, systems, and methods for allowing an occupant to adjust comfort level during normal vehicle operation and also reduce the likelihood and/or severity of injury to an occupant during an event. In at least some examples, techniques provided herein, may provide reversable lumbar support adjustment during normal operation as well as mitigate injuries/damages to an occupant when an impact occurs to the leading end of the vehicle while the occupant is seated facing the trailing end of the vehicle (e.g., opposite the direction of travel) and/or in the event of an occupant facing in the direction opposite to the direction from which vehicle collides or is predicted to collide with an object, such as when the collision with an object is behind the seatback of the seat where the occupant is seated, though any other direction of travel and occupant position is contemplated.

The multipurpose seatback bladder system as described can be implemented in any vehicle seat. In examples, the multipurpose seatback bladder system can be the only system provided in a seat of a vehicle. In examples, the multipurpose seatback bladder system as described herein may be employed with one or more other safety systems. In examples, the multipurpose seatback bladder system as described can be implemented in a seat who can also include one or more of an active headrest, such as disclosed for example in co-pending U.S. application Ser. No. 17/122,271, filed on Dec. 15, 2020, which is incorporated herein by reference in its entirety for all purposes. In examples, the multipurpose seatback bladder system as described may be employed together with a protection system as described for example in co-pending U.S. application Ser. No. 16/370,637, filed Mar. 29, 2019, and/or U.S. application Ser. No. 16/664,069, filed Oct. 25, 2019, both of which are incorporated herein by reference in their entirety for all purposes.

In some instances, prior to the change in velocity of the vehicle, a predicted change in velocity of the vehicle, a collision, or a predicted collision occurring and/or upon first entering the vehicle, one or more vehicle system(s) may determine a safe position of the occupant. For example, upon entering the vehicle, the occupant may be instructed to sit in the seat in an upright or seated position. In some instances, a display within the vehicle may illustrate or present content associated with a proper seating position or a proper position of the occupant. Camera(s), weight sensors, distance sensors, or other sensors within the vehicle, for example, may determine whether the occupant is positioned correctly relative to the seatback, vice versa.

In some instances, the event probability, i.e. the probability of a change in velocity or collision, may be determined based on a predicted intersection between the vehicle and the object. The predicted intersection may be associated with a predicted location of the vehicle and the predicted location of the object at a future instance in time. As discussed in detail herein, the vehicle may include one or more system(s) that determines the event probability based on sensor data received by sensor(s) of the vehicle, sensor(s) from other vehicles, sensor(s) associated with the vehicle, and so forth. The sensor data may include data associated with the vehicle and the object, such as information associated with physical characteristics, a location, and/or a movement associated with the vehicle and the object. Based on the sensor data, as well as the vehicle trajectory and/or the object trajectory, the vehicle systems may determine the event probability. The event probability may represent a likelihood, or risk, of an event between the vehicle and the object. Additionally, in some instances, one or more system(s) may determine whether a change in velocity of the vehicle, a predicted change in velocity of the vehicle, a collision, or a predicted collision is imminent. Whether the change in velocity of the vehicle, a predicted change in velocity of the vehicle, a collision, or a predicted collision is imminent may be based on predicting that the change in velocity of the vehicle, a predicted change in velocity of the vehicle, a collision, or a predicted collision occurs within a certain amount of time (e.g., one second, two seconds, etc.).

In examples, provided is a vehicle having a seat that may include a seat base configured to support at least a portion of weight of an occupant of the seat; a seatback associated with the seat base and configured to provide support to a back of the occupant; and a multipurpose seatback bladder system integrated in the seatback. In examples, the multipurpose seatback bladder system may include two or more inflatable bladders located in at least a portion of the seatback; a seat actuator configured to pressurize or depressurize the two or more inflatable bladders; and an actuator controller in communication with the seat actuator. In examples, the actuator controller in communication with the seat actuator may be configured to cause, based at least in part on a triggering event signal indicative of one or more of a change in velocity of the vehicle, a predicted change in velocity of the vehicle, a collision, or a predicted collision, the seat actuator to modify a stiffness of the portion of the seatback by deploying the two or more inflatable bladders; and cause, based at least in part on an lumbar adjustment trigger signal indicative of a command input, the seat actuator to modify a lumbar support at a portion of the seatback by independently adjusting a pressure of at least one of the two or more inflatable bladders.

In examples, provided is a multipurpose seatback bladder system for a vehicle, the multipurpose seatback bladder system may include a seatback configured to provide support to a back of an occupant when seated at a seat coupled to the vehicle; one or more inflatable bladders inside at portion of the seatback; a seat actuator configured to deploy the one or more inflatable bladders; and an actuator controller in communication with the seat actuator and configured to cause, based on a triggering event signal indicative of one or more of a change in velocity of the vehicle, a predicted change in velocity of the vehicle, a collision, or a predicted collision, the seat actuator to modify a stiffness of the portion of the seatback by pressurizing the one or more inflatable bladders; and cause, based on a lumbar adjustment trigger signal, an independent adjustment of a pressure inside at least one of the one or more inflatable bladders to modify a lumbar support of the seatback.

In examples, provided is one or more non-transitory computer-readable media storing instructions that, when executed by one or more processors, perform operations for enhancing rider experience in a vehicle, the operations may include enhancing occupant safety and enhancing occupant comfort. In examples, the operations may include enhancing occupant safety by predicting an event indicative of at least one of a change in velocity of the vehicle, a predicted change in velocity of the vehicle, a collision, or a predicted collision; causing, based on the predicting of the event, transmission of a triggering event signal to a multipurpose seatback bladder system integrated in a seatback of a vehicle seat; causing, based at least in part on the triggering event signal, the multipurpose seatback bladder system to change a stiffness of a portion of a seatback that faces at least a portion of a back of an occupant from a first stiffness to a second stiffness greater than the first stiffness by pressurizing one or more inflatable bladders. In examples, the operations may include enhancing occupant comfort by: receiving a lumbar adjustment command input from an input device; and causing, based at least in part on the lumbar adjustment command, the multipurpose seatback bladder system to independently modify a pressurization of at least one inflatable bladder of the one or more inflatable bladders, wherein the at least one inflatable bladder is located at a lumbar region of the seatback.

The techniques and systems described herein may be implemented in a number of ways. Example implementations are provided below with reference to the figures.

FIG. 1 is a side cutaway view showing an interior 100 of an example vehicle 102 including a pair of occupants 104 (e.g., occupants 104A and 104B). In examples, vehicle 102 can experience an event such as a predicted or actual change in velocity and/or a predicted collision or an actual collision involving the vehicle 102. The example vehicle 102 may be configured to travel via a road network from one geographic location to a destination carrying one or more of the occupants 104. For example, the interior 100 may include a plurality of seats 106 (e.g., seats 106A and 106B), which may be provided in any relative arrangement. In examples, seats 106 may be configured to accommodate one or more occupants. The example vehicle 102 shown in FIG. 1 includes an example carriage-style seating arrangement in a substantially central portion of the interior 100 of vehicle 102. For example, the vehicle 102 may include two or more rows 108 (e.g., rows 108A and 108B) of seats 106, and in some examples, two of the rows 108 of seats 106 may face each other, for example, as shown in FIG. 1. One or more of the rows 108 of seats 106 may include two seats 106. In some examples, one or more of the two seats 106 may be a bench-style seat configured to provide seating for one or more occupants 104. Other relative arrangements and numbers of seats 106 are contemplated.

For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 may be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially- or fully-autonomously controlled.

The example vehicle 102 may be any configuration of vehicle, such as, for example, a van, a sport utility vehicle, a cross-over vehicle, a truck, a bus, an agricultural vehicle, and a construction vehicle. The vehicle 102 may be powered by one or more internal combustion engines, one or more electric motors, hydrogen power, any combination thereof, and/or any other suitable power sources. Although the example vehicle 102 has four wheels 110, the systems and methods described herein may be incorporated into vehicles having fewer or a greater number of wheels, tires, and/or tracks. The example vehicle 102 may have four-wheel steering and may be multi-directional, configured to operate generally with equal performance characteristics in all directions. For example, the vehicle may be bidirectional such that a first end 112 of the vehicle 102 is the leading end of the vehicle 102 when travelling in a first direction 114, and such that the first end 112 becomes the trailing end of the vehicle 102 when traveling in the opposite, second direction 116, as shown in FIG. 1. Similarly, a second end 118 of the vehicle 102 is the leading end of the vehicle 102 when travelling in the second direction 116, and such that the second end 118 becomes the trailing end of the vehicle 102 when traveling in the opposite, first direction 114. These example characteristics may facilitate greater maneuverability, for example, in small spaces or crowded environments, such as parking lots and urban areas.

As shown in FIG. 1, the vehicle 102 may include a multipurpose seatback bladder system 120 configured to provide adjustable support and to protect one or more of the occupants 104 during a collision involving the vehicle 102. In some examples, the multipurpose seatback bladder system 120 may include, or be incorporated into, one or more portions of one or more of the seats 106 (e.g., a seatback). As shown in FIG. 1, each of the example seats 106 includes a seat base 122 configured to support at least a portion of a weight of an occupant 104, a seatback 124 associated with the seat base 122 (e.g., coupled to and/or adjacent to the seat base 122) and configured to provide support to a back 126 of an occupant 104 of the seat 106, and a headrest 128 associated with the seatback 124 (e.g., coupled to and/or adjacent to the seatback 124) and configured to provide support to a head and/or neck 130 of an occupant 104 of the seat 106. In examples, the multipurpose seatback bladder system 120 may be incorporated in seatback 124.

In examples, one or more sensors 158 may be provided in one or more portion of one or more of seats 106 (e.g., seat base, seatback, or headrest) configured to generate one or more signals indicative of the presence and/or absence of an occupant 104 on seat 106. When seated, a portion of the back 126 of the occupant 104 may be spaced from a first or front surface 132 of the seatback 124 by a space 134. As used herein, front surface 132 refers to a first outer surface of seatback 124 that faces back 126 of occupant 104 when the occupant 104 is seated in seat 106. The seatback 124 of one or more of the seats 106 may include a second or rear surface 136, which may be formed as part of the seatback 124 and/or, in some examples, may be coupled to, adjacent to, and/or at least partially formed by, a portion of the interior 100 of the vehicle 102. As used herein, rear surface 136 refers to a second outer surface of seatback 124 that faces in a direction opposite from the direction in which front surface 132 faces. Front surface 132 and rear surface 136 of seatback 124 as used herein refers to the outer surfaces of seatback 124 independent of the direction of travel of vehicle 102. In some examples, the multipurpose seatback bladder system 120 may be provided at each seat 106, at each row 108 of seats 106, and/or only at individual seats 106 or rows 108 of seats 106.

In examples, the multipurpose seatback bladder system 120 may include and/or be configured to interact with a user input device 160 configured to receive an input from a user to adjust a lumber support in seat 106. In examples, the input device 160 may be integrated in vehicle 102. In examples, the input device 160 may be a remote device. In examples, the multipurpose seatback bladder system 120 may include both an input device integrated in vehicle 102 and also receive input from a remote device.

In examples, vehicle 102 may include one or more seatbelt systems 140 including one or more seatbelts 138 (e.g. seatbelts 138A and 138B) to help restrain an occupant to the seat 106. For examples, a seatbelt system 140 including seatbelt 138A may prevent the occupant 104A from being thrown from the seat 106A toward the occupant 104B and/or the seat 106B. In examples, seatbelt system 140 may include motorized seatbelt (MSB) and/or a pretensioner system configured to adjust the tension of one or more seatbelts 138. In examples, seatbelt system 140 may be triggered in case of an event to help ensure that the occupant is maintained coupled to seat 106.

In examples, to provide safety to the occupant it may be desirable to construct the seatback 124 that is of a desired energy absorption stiffness when leaned against. In examples, seatback 124 may be configured to include at least in part of an energy absorbing material. For purposes of this disclosure, an energy absorbing material is a material configured to crush in plastic deformation under a threshold load or like material that requires in the range of about 20 kPa to about 500 kPa of pressure before undergoing deformation. In examples, an energy absorbing material is one that deforms under about 280 kPa and 350 kPa. Non limiting examples of energy absorbing material include polymeric foam (e.g., Impaxx 300, expanded polypropylene (EPP) foam density 30 grams per liter or 45 grams per liter, urethane foam, polystyrene foam, etc.), plastic, aluminum, cellulose based material, or a combination of these and/or other materials, for example. In examples, the energy absorbing material may be a substantially rigid foam configured to crush in plastic deformation under a threshold load. In examples, a portion or all of the energy absorbing material may be formed of a closed cell, thermoplastic foam having a density of at most 40 grams per liter, and a compression strength of at least about 300 kilopascals at 60 degrees Celsius and at most about 500 kilopascals at −15 degrees Celsius. However, these are merely examples and other similar or different materials may also be used.

In examples, to provide a more comfortable ride to the occupant it may be desirable to construct the seatback 124 to include a soft material to lean against. In examples, seatback 124 may be configured to include at least in part one or more comfort foam and/or comfort material. For purposes of this disclosure, a comfort foam and comfort materials refer to an elastomeric foam or like materials that require less than 20 kPa of pressure to undergo deformation.

In examples, a comfort foam or comfort material is a material that deforms when applying a pressure ranging from 5 kPa to 17 kPa. In examples, a comfort foam or comfort material is a material that deforms when applying a pressure of 8 kPa. Examples of comfort foam and/or comfort material can include a polyurethane. Other similar materials may also be used.

In examples, a seatback 124 may be configured to include one or more energy absorbing materials, and one or more comfort foam and/or comfort materials. In this manner, it may be possible to configure seatback 124 to have a desired level of stiffness when leaned against.

For purposes of this disclosure, the term stiffness is used to refer to a measure of resistance to deformation in response to an applied force. There may be a distinction between the stiffness of a material and the stiffness of a layer, section, structure, or portion. When referencing a material stiffness, the disclosure herein refers to a material property. A material stiffness depends on the material composition. When referencing the stiffness of the seatback or of a layer, section, or portion of an object such as the seatback, additional factors may be involved that may affect the overall stiffness of what is being discussed. The additional factors may include, without limitation, one or more of thickness of any one or more of layers, sections, portions, or objects, the combination of different layers, sections, portions, or objects, or the presence of additional device, such as for example, an inflated bladder as discussed in more detail herein. As such, the stiffness of a layer, section, portion, or object may be the same or different from the stiffness of just the material included in that layer, section, portion, or object. In examples described herein, the stiffness of a layer, section, portion, or object can be increased by compressing a layer of material.

In examples, the seatback 124 can include one or more layers or sections. The one or more layers or sections can include the same or different material. The one or more layers or sections can be configured to have the same or different thickness. The one or more layers or sections can be configured such that stiffness of the seatback 124 varies across the width or thickness of the seatback 124. In examples, a variation in stiffness across the width of seatback 124 can be achieved using different materials for different layers or sections. In examples, the variation in stiffness across the width of seatback 124 can be achieved by varying the thickness of one or more layers or sections. In examples, the variation in stiffness across the width of seatback 124 can be achieved by a combination of material selection and varying thickness for each layer or section. In examples, the stiffness of one or more layers or sections can be configured to include one or more support structures such as a frame, air pockets or any combination thereof.

In examples, the seatback 124 can include one or more portions. Each portion can be configured as one or more layers and/or sections. Reference to different portions of a seatback 124 is made only for description purposes. The portions are integral parts of seatback 124. The materials in the one or more portions can be arranged so that stiffness of the seatback 124 varies across the width of the seatback 124. The one or more portions of seatback 124 can include the same or different materials. In examples, seatback 124 can include at least a first portion and second portion. The stiffness of the first portion can be the same or different from the stiffness of the second portion. The stiffness of each portion may be uniform. The stiffness of each portion may vary across its own thickness. For example, a portion of seatback 124 can be configured to have two or more layers or sections exhibiting different stiffness. Each portion can be configured to have the same thickness as or different thickness from any other portion. In examples, the one or more layers or sections can be configured to include materials arranged so that the stiffness of the seatback 124 is greater at a rear portion than at a front portion. For example, a rear portion of seatback 124 may include one or more energy absorbing materials, while a front portion may include one or more comfort foams or comfort materials. The front portion of seatback 124 as referred to herein is intended as the portion of seatback 124 that is closest to the back 126 of an occupant when an occupant is seated on seat 106. In examples, a front portion of seatback 124 can include first or front surface 132. A rear portion of seatback 124 can be a portion of seatback 124 other than the front portion. In examples, the rear portion can include a second or rear surface 136 of seatback 124.

In examples, as shown in FIG. 1, as the vehicle 102 begins to change velocity, for example, reduce its velocity due to braking and/or due to a collision with an object with the first end 112 of the vehicle 102, the occupant 104A is restrained by a seatbelt 138A of a seatbelt system 140, which may prevent the occupant 104A from being thrown from the seat 106A toward the occupant 104B and/or the seat 106B. Although the occupant 104B is wearing a seatbelt 138B, the seatbelt 138B, at least initially, does not restrain the occupant 104B during the change in velocity and/or collision. Rather, at least the back 126 of the occupant 104B will be thrown toward the first or front surface 132 of the seatback 124 in the direction of travel.

In more detail, FIG. 1 depicts an example triggering event, such as, for example, a predicted or actual change in velocity, and/or a predicted collision or an actual collision. As shown in FIG. 1, the vehicle 102 is travelling at a velocity V in the first direction 114. A force F opposing the direction of travel is applied to the first end of the vehicle 102 in a direction generally consistent with the second direction 116. The occupant 104A is seated in the seat 106A facing in the direction of travel (i.e., the first direction 114), and the occupant 104B is seated in the seat 106B facing opposite the direction of travel, for example, with the back 126 of the occupant 104B facing the first or front surface 132 of the seatback 124. As shown, prior to the collision, the back of the occupant 104B may be spaced from the first or front surface 132 of the seatback 124 creating a space 134 therebetween.

The velocity of the back 126 of the occupant 104B will be substantially the same as the velocity of the vehicle 102 immediately prior to the reduction of the velocity of the vehicle 102 due to braking and/or the collision. The velocity of the back 126 of the occupant 104B will continue at this velocity until the back 126 of the occupant 104B couples to the first or front surface 132 of the seatback 124, at which time, the velocity of the back 126 of the occupant 104B will be subjected to an abrupt change in velocity as the seatback 124 stops the motion of the back 126 of the occupant 104B. This abrupt change in velocity may increase the likelihood and/or the severity of injury to the occupant 104B due to the collision. In some examples, the seatback 124 equipped with a multipurpose seatback bladder system 120 as described herein may be configured to change in stiffness to cause earlier engagement of the energy absorbing material. This may result in a lower the peak magnitude of the reaction forces, such as force due to acceleration and compression force, experienced by the occupant. Earlier engagement of the energy absorbing material may lead to a peak reaction force against the back 126 of the occupant 104B having a reduced and/or substantially reduced magnitude. In some examples, the seatback 124 equipped with the multipurpose seatback bladder system 120 may be configured also to quickly be coupled to the back 126 of the occupant 104B as described in more detailed below, and/or as, for examples, described in co-pending U.S. application Ser. Nos. 16/370, 637 and 16/664,069, the contents of which are incorporated herein by reference in their entirety.

Figure 2A:
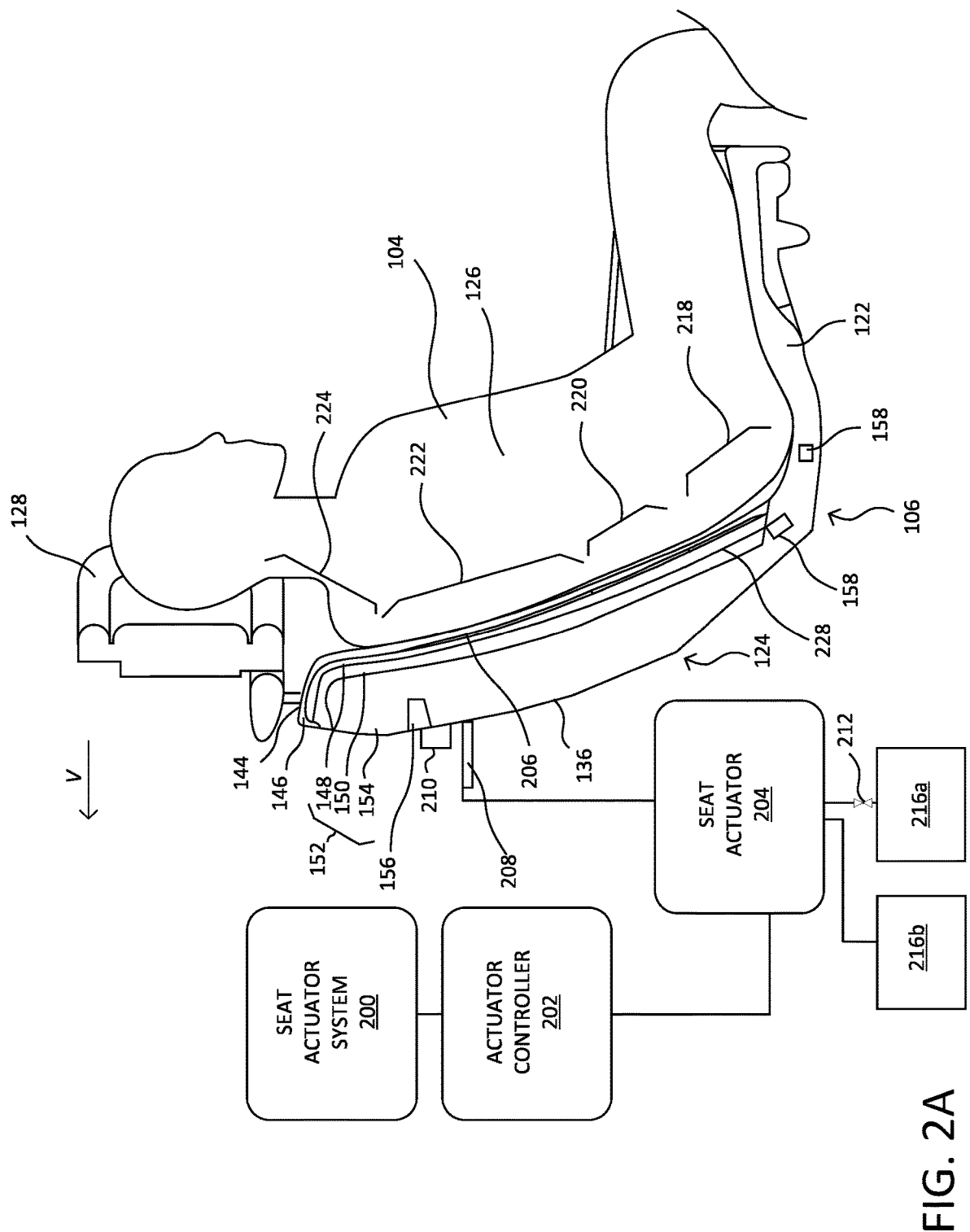
FIGS. 2A-2H are schematic views of examples of seatbacks and multipurpose seatback bladder systems as described herein.

FIG. 2A shows an example of a seat 106 equipped with a multipurpose seatback bladder system 120 in its undeployed state. In examples, as illustrated in FIG. 2A, seatback 124 can have a first portion as front portion 144. Front portion 144 can include the first or front surface 132 configured to face the back 126 of an occupant. Front portion 144 may be configured as one or more layers and/or sections 146. In examples, the one or more layers or sections 146 can include a comfort foam and/or comfort material. In the illustrated example, front portion 144 may be configured to have a single layer or section of a first material. The first material can be a comfort foam and/or comfort material. The first material can have a first material stiffness. In examples, front portion 144 is configured to have two or more layers and/or sections of the same or different comfort foam and/or comfort material. In examples, the layers or sections that make up front portion 144 can have the same or different thicknesses. In examples, the layers or sections that make up front portion 144 can be configured to exhibit the same or different stiffness. In examples in which seatback 124 is configured to have more than one portion, the stiffness of front portion 144 may be lower than the stiffness of any other portion included in seatback 124. In examples where the front portion 144 includes two or more layers and/or sections 146, the overall stiffness of front portion 144 can be lower than the overall stiffness of any other portion included in seatback 124.

In examples, as illustrated in FIG. 2A, seatback 124 may include a second portion or a rear portion 152 in addition to front portion 144. Rear portion 152 can include second or rear surface 136. Like front portion 144, rear portion 152 may be configured as one or more layers and/or sections. In examples, rear portion 152 may include, at least in part, one or more energy absorbing material. In examples, rear portion 152 may include one or more comfort foam and/or foam like materials. One or more comfort foam and/or foam like materials in rear portion 152 may provide the same or different level of stiffness as the comfort foam and/or foam like material of front portion 144. In examples, rear portion 152 may be configured to have the same thickness as front portion 144. In examples, rear portion 152 may be configured to have a different thickness than front portion 144. In examples, rear portion 152 may be configured to have a thickness that is greater than the thickness of front portion 144. In examples, rear portion 152 may be configured to have a thickness that is smaller than the thickness of front portion 144.

In examples, rear portion 152 may be configured as two or more layers and/or sections. Rear portion 152 as shown in FIG. 2A is only an example. Rear portion 152 may be tuned to exhibit any desired crushability performance. The thickness, structure design, and material used for any layer and/or section that forms rear portion 152 can be selected based on the desired performance. In examples, rear portion 152 can be configured to include one or more of a second layer or section 148, a third layer or section 150, a fourth layer or section 154. In examples, rear portion 152 may be configured to include one or more features 156 such as one or more support structures, like a frame, one or more air pockets, one or more materials that is not a comfort foam or an energy absorbing material, or any combination thereof. As illustrated in FIG. 2A, in examples, one or more features 156 such as air pockets can be defined in at least a portion of layer or section 154.

The configuration of front and rear portions 144 and 152 is not limited to the illustrated configuration. Front and rear portions 144 and 152 can be configured to have fewer or additional layers, sections, and/or features than as illustrated.

In examples, the stiffness of rear portion 152 can be set by using different materials for the one or more layers, sections, or structures that make up rear portion 152. For example, a second material, having a second stiffness, may be used for second layer or section 148. A third material, having a third stiffness, may be used for third layer or section 150. A fourth material, having a fourth stiffness, may be used for fourth layer or section 154. In examples, the stiffness of rear portion 152 may also be affected by the thickness of the layers or sections and/or structures that make up rear portion 152. In examples, the layers or sections that make up rear portion 152 can have the same or different thickness.

The stiffness of two or more materials used for different layers or sections and/or structures that make up seatback 124 may be the same or different. In examples, at least two of the first, second, third, and fourth materials have different material stiffness. Likewise, the stiffness of two or more layers, sections, or portions of seatback 124 can have the same or different stiffness. In examples, one portion of seatback 124 has a stiffness that is greater than or less then the stiffness of at least a second portion of seatback 124. In examples, a layer or section in seatback 124 has a stiffness that is the same as, greater than, or less than the stiffness of another layer or section of seatback 124.

In examples, although the makeup of the seatback 124 with one or more layers or sections of comfort material as described above, it may still not provide the most comfort to an occupant. In examples, the manner in which an occupant sits, the shape and/or size of the back of an occupant, and/or the contour of surface 132 of a seat 106 may results in weak or no support at a lumbar region. In examples, to improve support at a lumbar region for an occupant, a multipurpose seatback bladder system 120 as described herein may be provided to include one or more inflatable bladders that may be reversibly inflated at varying degrees to adjust the support seatback 124 may provide at a lumbar region.

In examples, a multipurpose seatback bladder system 120 as described herein may also be configured to improve safety of a passenger by increasing the stiffness of at least a portion of the seat 106 during an event or a collision event such as a collision, predicted collision, and/or other abrupt change of speed to thereby minimize delay in the engagement of energy absorption material of seatback 124 that provides the bulk of a reactionary force.

As shown in FIG. 2A, an occupant 104 may be provided on seat 106. In examples, seat 106 shown in FIG. 2A may include seat base 122 configured to support at least a portion of a weight of the occupant 104 of the seat 106, and an example seatback 124 associated with (e.g., coupled to) the seat base 122 and configured to provide support to at least a portion of the back 126 of the occupant 104. In the example shown in FIG. 2A, the example seatback 124 may include one or more layers, sections, or portions as previously described. In the example of FIG. 2A, seatback 124 can include a first portion 144 and a second portion 152. The first portion 144 includes first or front surface 132 and a first layer or section 146 of material and constitutes a front portion of seatback 124. The second portion 152 is illustrated as including two or more layers or sections such as second layer or section 148, third layer or section 150, and fourth layer or section 154. The second portion 152 can include second or rear surface 136 and constitute a rear portion of the seatback 124. As illustrated, second or rear portion 152 may include one or more features 156.

In examples, the first and second layers or sections 146 and 148 in the first and second portions 144 and 152 can be formed of comfort foam or comfort material. In examples, the material used in layers or section 146 and 148 may be the same or different. In examples, the third and fourth layer or section 150 and 154 of second portion 152 can include an energy absorbing material. The material used in layer or section 150 can be the same or different from the material used in layer or section 154. In examples, the stiffness of portion 144 is less than the stiffness of portion 152. In examples, the stiffness of the first layer or section 146 in portion 144 is less than the stiffness of the second, third, and fourth layers or sections 148, 150, and 154 in the second portion 152. In examples, the stiffness of the first layer or section 146 is equal to or less than the stiffness of the second layer or section 148. In examples, the stiffness of the second layer or section 148 is equal to or less than the stiffness of the third layer or section 150. In examples, the stiffness of the third layer or section 150 is equal to or less than the stiffness of the fourth layer or section 154.

In examples, when an occupant 104 sits on seat 106 during normal vehicle operations, the back 126 of occupant 104 may press against at least a portion of surface 132 of the seatback 124. In so doing, the occupant 104 presses against the one or more layers of comfort material that may be provided in seatback 124 which provide for a more comfortable ride. However, depending on the size of the occupant and the manner the occupant may be sitting, the comfort material of seatback 124 may not provide sufficient support at least at a lumbar region that would improve rider experience.

Also, when vehicle 102 experiences a change in velocity consistent with a collision, such as, for example, a predicted or actual change in velocity, and/or a predicted collision or an actual collision involving the vehicle 102, as the back 126 of occupant 104B presses further against seatback 124, the force exerted at the first or front surface 132 of seatback 124 may further compress one or more of the first, second, third, and fourth layers or sections. As these layers or sections are further compressed, they provide a reaction force commensurate to their degree of stiffness. In examples, the one or more layers, sections, or portions of seatback 124 will provide sufficient reaction force toward the back 126 of occupant 104 to counter the force back 126 of occupant 104 exerts on seatback 124. Although reaction force in ultimately provided, there may be a time lapse while the one or more layers, sections, or portions of comfort material provided closest to the first or front surface 132 of seatback 124 continues to compress providing minimal reaction force before the energy absorbing material provided in seatback 124 is engaged. In examples, one or more proximate or adjacent or consecutive layers or sections of comfort foam or comfort material may account for an aggregate total thickness ranging from 10 mm to 80 mm, in examples 20 mm to 25 mm. The comfort foam or comfort material will easily deform without providing much reaction force. Although, the amount of reaction force exhibited by the comfort material may be low, after the comfort foam or comfort material has been fully or almost fully compressed the energy absorbing material of seatback 124 is engaged and the reaction force may suddenly peak. Thus, the compression of the comfort foam or comfort material delays the engagement of the energy absorbing material and thus of application of substantive reaction force by seatback 124. The longer the ride down distance is, the longer the delay is in the application of the reaction force, and the greater the peak reaction forces an occupant may experience become. As such, the longer it takes for the energy absorbing material to engage and apply a reaction force, the greater the peak of reaction force may become upon application. This may likely lead to injury to the occupant.

In examples, seat 106 may include a seatback 124 that may include or incorporate at least a portion of the multipurpose seatback bladder system 120 to address these issues and improve rider comfort and safety. In examples, the multipurpose seatback bladder system 120 can be configured to allow for controllable and reversible adjustment of a lumbar support for rider comfort during normal vehicle operation and to at least improve energy dissipation by decreasing the peak magnitude of an applied reaction force during an event. In examples, multipurpose seatback bladder system 120 can be configured to reduce or eliminate peaks in applied reaction force during an event. In examples, the multipurpose seatback bladder system 120 can be configured to cause a more gradual energy dissipation during an event that can present a decreased probability for injury. In examples, during an event the multipurpose seatback bladder system 120 can be configured to cause the stiffness of seatback 124 or of at least a portion, layer, or section of seatback 124 to increase in response to a signal indicating a change in velocity. In examples, during an event the multipurpose seatback bladder system 120 can be configured to compress the comfortable foam or comfort material to cause engagement of the energy absorbing material sooner.

As illustrated in FIG. 2A, in examples, multipurpose seatback bladder system 120 may include a seat actuator system 200. In examples, the seat actuator system 200 can include an actuator controller 202, and a seat actuator 204. In examples, the seat actuator 204 can include one or more inflatable bladders 206 located in seatback 124. In examples, the seat actuator 204 can include at least two or more inflatable bladders 206 located in seatback 124. In examples, the seat actuator 204 can include at least one or more inflatable bladders located in a lumbar region 220 of seatback 124 and at least one or more inflatable bladders are located in a region other than the lumbar region 220 of seatback 124, such as for example the pelvic region 218 and/or thoracic region 222. In examples, the one or more inflatable bladders located at lumbar region 220 of seatback 124 may be independently controlled. In examples, the one or more inflatable bladders located at lumbar region 220 of seatback 124 may be independently controlled from each other and/or from other one or more inflatable bladders located elsewhere in seatback 124. In examples, at least the one or more inflatable bladders located at lumbar region 220 of seatback 124 may be reversibly pressurized and depressurized. In examples, the seat actuator 204 can include one or more expansion devices 208. In examples, the seat actuator 204 can include one or more vents 210. In examples any one of the one or more expansion devices 208 can be in fluid communication with or operably connected to at least one of the one or more inflatable bladders 206. In examples, any one or more vents 210 can be in fluid communication with or operably connected to at least one of the one or more inflatable bladders 206. In examples, seat actuator 204 can access one or more fuel sources 216.

In examples, the seat actuator 204 can include one or more expandable portions located inside seatback 124. In examples, the one or more expandable portions can be one or more inflatable bladders 206. In examples, seat actuator 204 includes an expandable portion consisting of a single inflatable bladder 206. In examples, an expandable portion of seat actuator 204 can include one or more inflatable bladders 206.

When deployed, i.e. pressurized or inflated, one or more inflatable bladders 206 can provide a stiffer support than what may be provided by the comfort foam or comfort materials used to for the one or more layers, sections, or portions of seatback 124. In examples, one or more bladders 206 can be located at first or front surface 132 of seatback 124. As such, when pressurized or inflated, the bladder 206 can provide a stiffness against at least a portion of back 126 of occupant 104 at first or front the surface 132 of seatback 124. Likewise, as the one or more inflatable bladders 206 are inflated or pressurized, they press against surface 132 of seatback 124 and thus against any layer or section of comfort foam or comfort material beneath first or front surface 132. In so doing, the pressurized or inflated one or more bladders 206 compress the comfort foam or comfort material. Similarly, in examples where at least one layer or section of comfort foam or comfort material is between one or more inflatable bladders 206 and first or front surface 132 of seatback 124 and/or in examples where one or more inflatable bladders 206 are located between two consecutive or adjacent layers or sections of comfort foam or comfort material, when the one or more inflatable bladders 206 are pressurized or inflated they will press against and thus at least partially compress the comfort foam or comfort material of the adjacent layers or sections. By compressing at least in part the comfort foam or comfort material of at least one or more layers, sections, or portions of seatback 124, the seatback 124 will provide additional back support at one or more regions such as the lumbar region of seatback 124 and/or increase in stiffness and cause an earlier application of a reactive force to back 126 of occupant 104 then if no inflatable bladder were present. In this manner, additional lumbar support to improve rider experience may be provided during normal vehicle operation, and in case of an event, the energy absorbing material can be more quickly engaged, and the reaction force can be applied earlier, thus spreading out the application of the reaction force more gradually, or at a lower magnitude during the collision event.

In examples, an inflatable bladder 206 may have any desired design and can include one or more chambers. In examples, an inflatable bladder 206 may be configured to have two or more chambers. In examples, an inflatable bladder 206 may be configured to have three chambers. Fewer or more chambers may also be implemented. In examples, the inflatable bladder 206 has one chamber. In examples, the inflatable bladder 206 can have two or more chambers.

An inflatable bladder 206 may be formed from an impermeable, semi-permeable, and/or permeable material, such that flow of air and/or fluid (e.g., a gas and/or a liquid) through the inflatable bladder 206 may be at least partially inhibited. Inflatable bladder 206 can be made of any known material used for front impact airbags in vehicles. Inflatable bladder 206 can be made of nylon fabric. In examples, inflatable bladder 206 can be may of a polymer fabric, sheet metal, metal foil, natural fiber, or any combination thereof.

The one or more inflatable bladders 206 can be sized and shaped as desired. In examples, an inflatable bladder located anywhere in seatback 124 can have a height ranging from 100 mm to 600 mm. In examples, an inflatable bladder can have a height ranging from 200 to 400 mm. In examples, an inflatable bladder anywhere in seatback 124 can have a breadth ranging from 200 mm to 600 mm, in examples an inflatable bladder can have a breadth ranging from 250 to 400 mm. In examples, one or more inflatable bladders located in the lumbar region 220 of seatback 124 may be shaped and sized to provide either alone or in combination a lumbar support having a circular or oval shape with a radius or breadth of about 150 mm to 300 mm. In examples, when deployed, i.e. fully pressurized or inflated, to enhance safety of an occupant during an event, one or more inflatable bladders in one or more regions of the seatback 124 can each independently have a thickness ranging from about 15 mm to 100 mm, in examples, the one or more inflatable bladders can each independently have a thickness of about 30 mm. In examples, when deployed, i.e. fully pressurized or inflated, the inflatable bladder may have a volume ranging from 0.4 liters to 16 liters. In examples, when deployed, i.e. fully pressurized or inflated, to enhance rider comfort by providing lumbar support during normal vehicle operation, one or more inflatable bladders provided in the lumbar region 220 of seatback 124 can each independently have a thickness ranging from about 10 mm to 40 mm. In examples, one or more inflatable bladders in the lumbar region 220 of seatback 124 can each independently have a thickness of about 15 mm to 20 mm when fully inflated to provide rider comfort during normal vehicle operation.

In examples, the size of the one or more dimensions of the inflatable bladder can be selected based on the size of seatback 124. In examples, the deployed thickness of the inflatable bladder can be selected based on the amount of comfort foam or comfort material used for the one or more layers, sections, or portions of seatback 124. In examples, the size of the one or more dimensions of the inflatable bladder can be selected based on the intended location for the inflatable bladder. In examples, the size of the one or more dimensions of the inflatable bladder can be selected based on the desired shape of the inflatable bladder.

An inflatable bladder 206 can have any desired shape. In examples, an inflatable bladder can be circular, oval, square, rectangular, polygonal, or have any regular or irregular shape. In examples, the shape of a bladder 206 can be selected based on the shape of the seatback 124, the intended location for the inflatable bladder, the size of the inflatable bladder, or any combination thereof. In examples, one or more restraining means (not shown) such as tethers, belts, ribs or like structures can be included inside, outside, or both inside and outside of the one or more inflatable bladders to ensure that when deployed an inflatable bladder can maintain a desired shape, size, or both. Using one or more restraining means can be advantageous in the event an inflatable bladder is over pressurized. In examples, having one or more restraining means included in the one or more inflatable bladders can help avoid compressing the energy absorbing material during deployment of the one or more inflatable bladders. In examples, one or more restraining means may be configured to also define two or more chambers in an inflatable bladder 206.

In exemplary embodiments, the seat actuator 204 can include an expandable portion with one or more inflatable bladders 206. In exemplary embodiments, the seat actuator 204 can include an expandable portion with more than one inflatable bladders 206. In examples, the size and shape of each inflatable bladder 206 can be selected based on the size of the seatback 124, amount of comfort foam or comfort material used for the one or more layers, sections, or portions of seatback 124, the total number of inflatable bladders present, the location of the inflatable bladder, or any combination thereof.

The location in seatback 124 of the one or more inflatable bladders 206 of the expandable portion of seat actuator 204 can be selected based on the desired effect.

FIG. 2A illustrates that seatback 124 can be configured to support one or more body areas of an occupant. For examples, seatback 124 can support the cervical region 224, the thoracic region 222, the lumbar region 220, the pelvic region 218, or any combination thereof. For purposes of this disclosure, these regions are intended to correspond respectively to the neck or cervical region 224, torso or thoracic region 222, lower back or lumbar region 220, and the pelvis or pelvic region 218 of a seated occupant 104. The seats described in this application may be designed to accommodate passengers of a variety of heights. For purposes of these region descriptions, the regions are described with reference to an example occupant 104 that is 176 cm in height, with a sitting height of 91 cm. For purposes of this disclosure, the lumbar region 220 of a seatback 124 is understood to be the location of seatback 124 that approximately corresponds to the L2 to L5 spinal vertebrae of the occupant. In examples, the lumbar region 220 of seatback 124 may be understood as located from about 105 mm to about 155 mm above the hip point (H-point), with a mean height of about 150 mm about the H-point. For purposes of this disclosure, the H-point should be understood as defined by the Society of Automotive Engineers (SAE) standard J1100 Interior Measurement Index (revision of Nov. 20, 2009). The pelvic region 218 of seatback 124 should be understood as the region below, in the vertical axis, the lumbar region 220. The thoracic region 222 should be understood to be directly above, in the vertical axis, the lumbar region 220 and the cervical region 224 should be understood as being above the thoracic region 222.

As illustrated in FIG. 2A, one or more inflatable bladders 206 can be at one or more locations inside of seatback 124. In examples, the multipurpose seatback bladder system 120 as described herein may include one or more sets of inflatable bladders 206. In examples, the multipurpose seatback bladder system 120 as described herein may include at least two sets of inflatable bladders 206. In examples, a set of one or more inflatable bladders 206 may be configured to adjust lumbar support and to assist in stiffening the seatback 124 during an event. In examples, a set of one or more inflatable bladders 206 may be configured to only assist with stiffening seatback 124 during an event. For example, a seatback 124 may include a first set of at least one or more inflatable bladders 206 at a lumbar region of seatback 124 and a second set of at least one or more inflatable bladders 206 at one or more regions other than the lumbar region of the seatback 124. In examples, the one or more inflatable bladders located at lumbar region 220 of seatback 124 may be independently and reversibly controlled, i.e. pressurized and depressurized. In examples, the one or more inflatable bladders located at lumbar region 220 of seatback 124 may be controlled independent of each other and/or of other inflatable bladders located at regions other than lumbar region 220 of seatback 124. In examples, all inflatable bladders 206 provided anywhere in seatback 124 are reversibly controlled.

In examples, any of the one or more inflatable bladders 206 may be sized and located to extend across any one or more of the regions 218, 220, 222, and 224. In examples, at least one inflatable bladder 206 extends across two or more of the above regions 218, 220, 222, and 224. In examples, the inflatable bladder 206 extends across the thoracic region 222. In examples, the inflatable bladder 206 extends across the thoracic region 222 and the lumbar region 220. In examples, the inflatable bladder 206 is located such that it can reach one or more of the above regions. For example, an inflatable bladder 206 can extend from the cervical region 224, across thoracic region 222, to the lumbar region 220. In examples, one or more inflatable bladders 206 can located at one or more of the above regions. For example, a separate inflatable bladder 206 can be located at each region 218, 220, 222, and 224. In examples, a separate inflatable bladder 206 is located at each of one or more regions 218, 220, 222, and 224. In examples, at least one inflatable bladder may be located within at least one other inflatable bladder. In examples, a first inflatable bladder may be provided at lumbar region 220 and be located within a second inflatable bladder that extends across the lumbar region 220 and at least another one of regions 224, 222, and 218. Any combination can be implemented. In examples, a first inflatable bladder 206 can be located at the thoracic region 222, and a second inflatable bladder 206 can be located at the lumbar region 220.

Various means may be employed to secure one or more inflatable bladders 206 in place. In examples, the one or more inflatable bladders 206 can be attached to one or more layers or sections of seatback 124. For examples, one or more inflatable bladders 206 can be secured in place by stitching, adhesive, hook and loop fasteners, one or more pins or like fastening means.

In examples, the one or more inflatable bladders 206 can be provided proximate to, adjacent to, or in proximity of one or more layers or sections of comfort foam or comfort material in seatback 124. In examples, one or more inflatable bladders 206 can be located at first or front surface 132 of seatback 124. In examples, one or more inflatable bladders 206 can be located between a first layer or section of comfortable foam or comfort material and second or rear surface 136 of seatback 124.

In examples, one or more inflatable bladders 206 can be located at an intermediate portion of seatback 124 that may be between two other portions. For example, intermediate portion may be between two consecutive layers or sections or portion of seatback 124. For example, intermediate portion may be between a portion 144 and a portion 152 as described herein. Intermediate portion may be inside seatback 124. In examples, one or more inflatable bladders 206 can be located between a first layer or section 146, or portion 144 of seatback 124 and second or rear surface 136 of seatback 124.

In examples, one or more layers of the comfort material may be contained within an enclosure 228. When such an enclosure 228 is present, one or more inflatable bladders 206 may be located inside or outside the same enclosure. In examples, one or more layers or sections of comfort material and one or more inflatable bladders 206 are contained within an enclosure 228. For example, as shown in FIG. 2A, layers or sections 146 and 148 of comfort material can be inside enclosure 228 along with one or more inflatable bladders 206. The enclosure may be permeable and/or include a filter, vent, or other mechanism to enable air to leave the enclosure with constraining comfort material. The vent or filter of enclosure 228 can be similar to vent 210. In examples, a vent 210 can be used for both an inflatable bladder 206 and an enclosure 228. In response to a compression actuator being enabled and one or more inflatable bladders 206 expanded, comfort foam can be compressed within an enclosure 228. In case of an event, the compressed comfort foam within enclosure 228 may form a structure that may act as an energy absorbing material sufficient to mitigate at least in part damage to an occupant during the event. The enclosure can be a permeable or impermeable membrane and can be made of similar materials as described for the one or more inflatable bladders 206. In examples, the enclosure may include the outer surface of the seatback 124. In examples, the enclosure 228 surrounding the comfort material can be an enclosing membrane within seatback 124.

In examples, one or more inflatable bladders can be located between a first portion 144 of seatback 124 and a second portion 152 of seatback 124. For example, one or more inflatable bladders 206 can be located between front portion 144 and rear portion 152. In examples, one or more inflatable bladders can be located between a first layer or section 146 of portion 144 of seatback 124 and second layer or section 148 of portion 152 of seatback 124.

In examples, one or more inflatable bladders 206 may be located proximate to or adjacent to one or more of a comfort foam or comfort material layer or section. For examples, one or more inflatable bladders 206 can be located proximate to or adjacent to one layer or section 146, layer or section 148, or both. In examples, the one or more inflatable bladders 206 can be located inside second or rear portion 152 of seatback 124 between any two layers or sections at least one of which includes comfort foam or comfort material. For example, one or more inflatable bladders 206 can be located between second layer or section 148 and third layer or section 150.

In examples, two or more inflatable bladders 206 may be located at different portions of seatback 124. In examples, an inflatable bladder 206 may be spaced in the x (lateral), y (vertical), and/or z (longitudinal) direction from a second inflatable bladder 206. In examples, a first and second inflatable bladders 206 are spaced from each other in the x, y, and/or z directions. For instance, in examples, a first and second inflatable bladders 206 may be spaced in the lateral direction for the same and/or for two separate seating positions. In examples, a first and second inflatable bladders 206 may be spaced in the vertical direction for upper and lower portions of a same seating position. In examples, a first and second inflatable bladders 206 may be spaced in the longitudinal direction, for example in a stacked configuration one in front of the other and/or one being ahead of the other with respect to the position of the occupant. For example, one or more inflatable bladder 206 can be located between first layer or section 146 and second layer or section 148, and one or more inflatable bladder 206 can be located at the surface 132 of seatback 124. In examples, one or more inflatable bladder 206 can be located between first layer or section 146 and second layer or section 148, and one or more inflatable bladder 206 can be located between second layer or section 148 and third layer or section 150 of seatback 124. Also, an inflatable bladder 206 may be located in the lumbar region of seatback 124 while another inflatable bladder 206 may be located in the thoracic region of seatback 124. In examples, two or more inflatable bladders 206 may be located in the same region. For example, two inflatable bladders 206 may be both located in the thoracic region of seatback 124 either spaced in the x-direction (i.e. laterally), in the y-direction (i.e. vertically), and/or in the z-direction (i.e. longitudinally).

In examples, the one or more inflatable bladders 206 can be independently controlled and/or operated. In examples, where seat actuator 204 is configured with two or more inflatable bladders 206 located in seatback 124, the two or more inflatable bladders 206 can be deployed simultaneous, at different times, selectively, or any combination thereof. Selective deployment may include the deployment of at least one but not all, of the two or more inflatable bladders 206. In examples, the multipurpose seatback bladder system 120 can be configured to cause deployment of the one or more inflatable bladders 206 depending on any one or more of a command input for lumbar support adjustment, parameters such as environment, type or degree of change in velocity experienced by the vehicle 102, type or degree of an actual collision or predicted collision involving vehicle 102, the presence or absence of an occupant 104, a weight of occupant 104, a height or sitting height of an occupant 104, a width of an occupant 104, the sitting position of occupant 104, the presence or absence of a riding aid device such as a child car seat, a selected input by an occupant or user of vehicle 102, a presetting in vehicle computing device(s) 304, a presetting in computing device(s) 330, or any combination thereof.

Figure 2B:
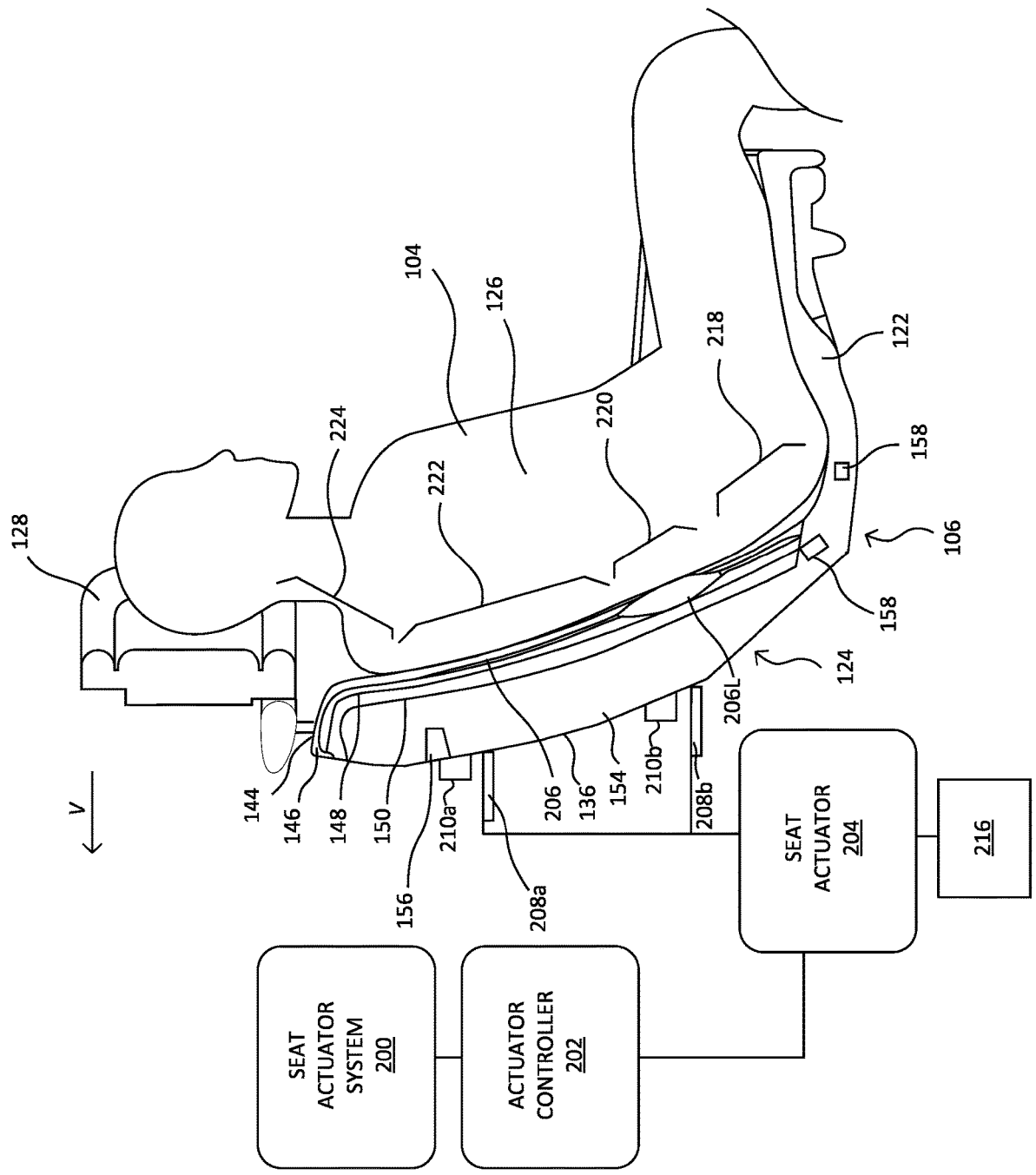
Figure 2C:
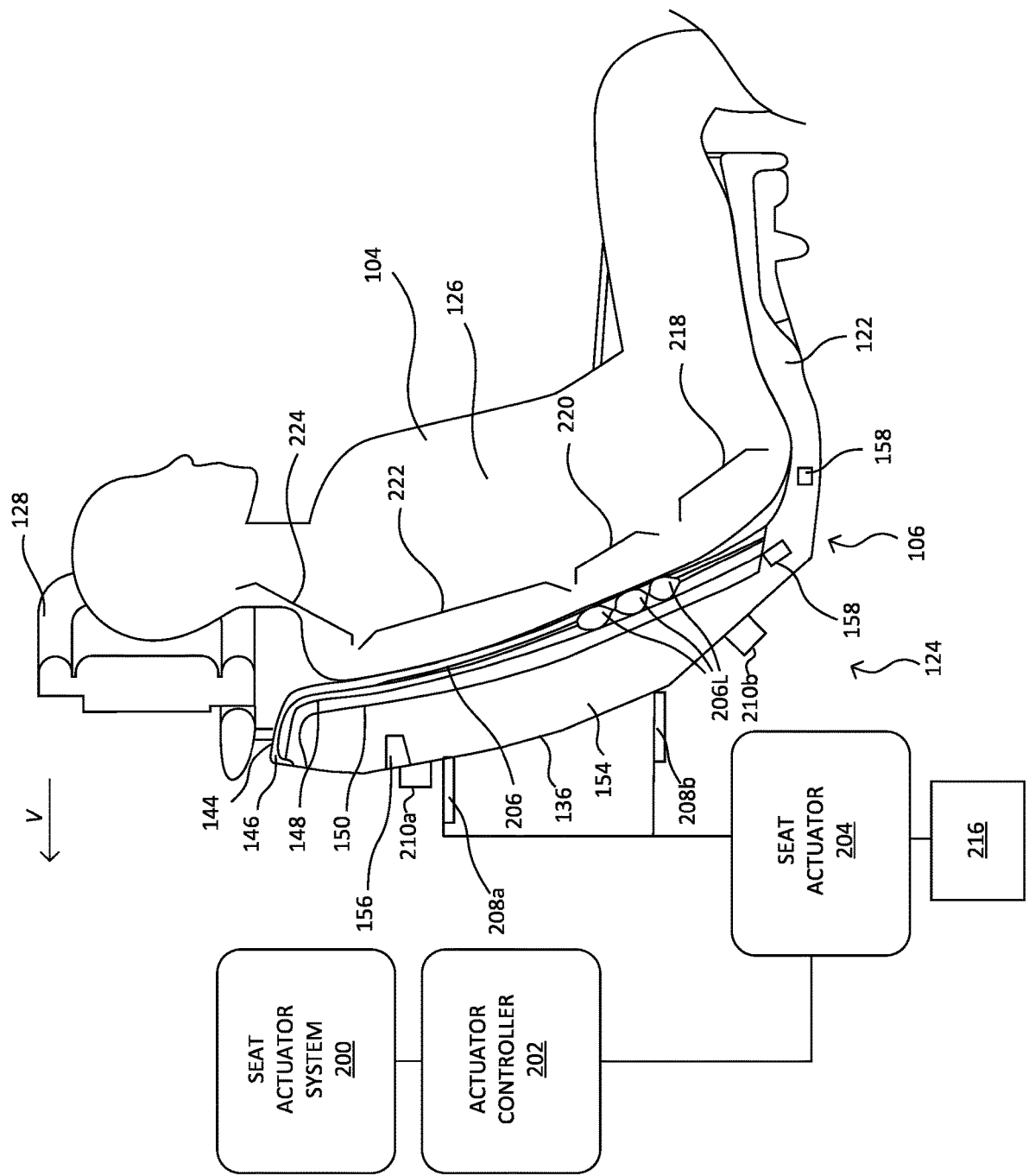

In examples, as shown in FIGS. 2B and 2C, a multipurpose seatback bladder system 120 may include one or more lumbar region inflatable bladders 206L provided in lumbar region 220 of seatback 124 may be reversibly controlled to adjust the lumbar support of seat 106 during normal vehicle operation.

FIG. 2B illustrates an embodiment in which the multipurpose seatback bladder system 120 may include one inflatable bladder 206L in lumbar region 220 of seatback 124. In examples, the multipurpose seatback bladder system 120 may be configured to provide adjustable lumbar support at varying heights and/or locations at lumbar region 220 of seatback 124. For example, FIG. 2C illustrates an embodiment in which the multipurpose seatback bladder system 120 may include two or more inflatable bladders 206L in lumbar region 220 of seatback 124. In examples, multiple inflatable bladders 206L provided in lumbar region 220 of seatback 124 may allow for enhanced adjustment flexibility of the lumbar support. In examples, by providing two or more independently controllable inflatable bladders 206L at or proximate to lumbar region 220 of seatback 124, it may be possible to adjust lumbar support at varying heights and/or locations at lumbar region 220 of seatback 124 in addition to adjusting degree of lumbar support. In examples, vehicle system 300 may, based on one or more sensors (e.g., sensors of sensor system 306 and/or sensor 158), detect one or more of a weight, size, shape, and sitting position of an occupant and/or the presence of any object or seating devices such as a booster seat or the like, and automatically determine and/or implement a recommended lumbar support adjustment and/or prevent one or more lumbar support adjustments at one or more locations of seatback 124. This may lead to improved rider comfort, prevent injury, and/or assist with or prevent interference with the use of an object or device such as a booster seat or other like structure.

In examples, one or more inflatable bladders 206L may be inflated and/or deflated in response to a command input. In examples, the command input may be received at vehicle 102 and/or from a remote device. In examples, one or more inflatable bladders 206L provided in the lumbar region 220 may be reversibly controlled independently of any one or more inflatable bladders 206 located elsewhere in seatback 124. In examples, reversibly controlled is used to indicate that an inflatable bladder may be inflated and deflated multiple times without requiring replacement or service after every cycle. In examples, the control input may be received from an input device 160. In examples, the input device 160 may be provided in vehicle 102 such as a dial, touchscreen, button, voice command, and/or mechanical lever provided in vehicle 102. In examples, the control input device 160 may be a remote device. For example, the vehicle system of vehicle 102 may be in communication with one or more remote input devices 160. In examples, the communication may be wired and/or wireless. In examples, the remote input device 160 may include a remote control, computing device, or cloud-based system. In examples, the remote input device may include a computing device such as a portable computing device. In examples, a portable computing device may include a smart phone, a tablet, a laptop, a personal assistant device, or like devices. In examples, a combination of input devices 160 that include one or more integrated at vehicle 102 and one or more remote input devices may be implemented. In examples, an application running on input device 160 may be employed to allow interaction with the vehicle system of vehicle 102 and input a command to cause inflation and/or deflation of one or more inflatable bladders 206L located in a lumbar region 220 of seatback 124. In examples, the application may be stored in vehicle 102, in the input device 160 communicating with vehicle 102, or both.

In examples, multipurpose seatback bladder system 120 may also include one or more inflatable bladders 206 located in seatback 124 at locations other than the lumbar region. In examples, the one or more inflatable bladders located at regions other than the lumbar region may also be reversibly controlled. In examples, the one or more inflatable bladders located at regions other than the lumbar region may be configured to be triggered to be deployed in case of an event. In examples, the one or more inflatable bladders located at region other than the lumbar region may be controlled independently of the one or more inflatable bladders located in the lumbar region.

Figure 2D:
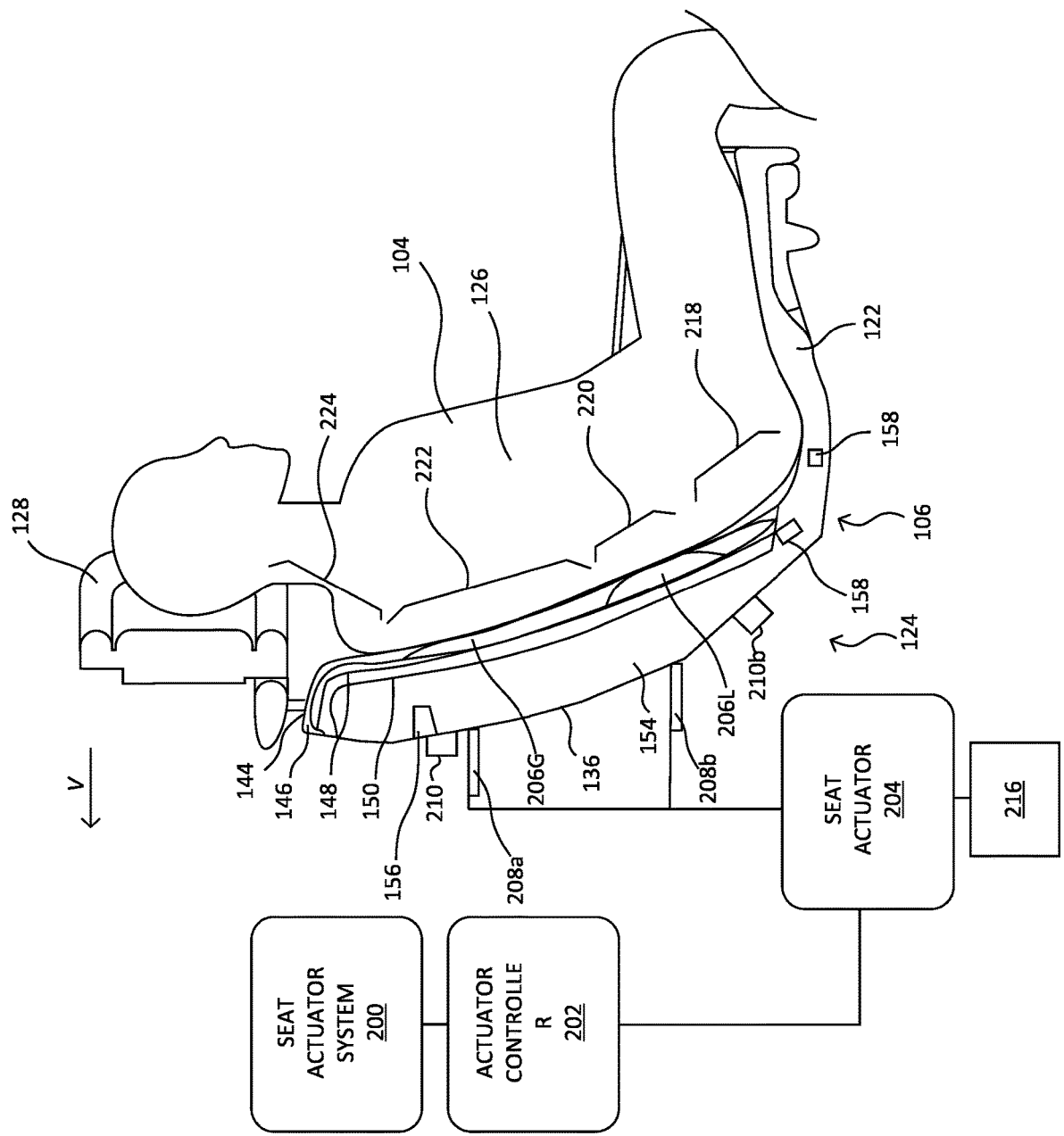

FIG. 2D illustrates an example in which one or more inflatable bladders 206L provided in lumbar region 220 of seatback 124 may be located inside one or more larger inflatable bladders 206G. In examples, the one or more larger inflatable bladders 206G may extend across one or more regions of seatback 124. For example, as illustrated in FIG. 2D, a lumbar region inflatable bladder 206L may be located inside a larger inflatable bladder 206G that may extend from the thoracis region 222 of seatback 124 to the pelvic region 218 of seatback 124. In examples, during normal vehicle operation, lumbar support may be adjusted by inflation and deflation of lumbar inflatable bladder 206L located in lumbar region 220 inside the larger inflatable bladder 206G. During normal vehicle operation, inflatable bladder 206G would remain in the stowed or deflated state but configured to provide sufficient room to allow for inflation and deflation of lumbar inflatable bladder 206L. In case of an event, the multipurpose seatback bladder system 120 would cause the larger inflatable bladder 206G to deploy and thus inflate to modify the stiffness of the seatback 124 across different regions and cause early engagement of the energy absorption material as previously described. In examples, while inflatable bladder 206G is deployed, the multipurpose seatback bladder system 120 may cause lumbar inflatable bladder 206L to partially or fully inflate or remain inflated, partially or fully deflate or remain deflated, or remain unaffected.

In examples discussed in conjunction with FIGS. 2B-2D during normal vehicle operation the one or more inflatable bladders 206L provided in the lumbar region 220 of seatback 124 may be configured to be inflated and deflated as desired using an input command, while the inflatable bladders located at and/or extending to one or more regions of seatback 124 beyond lumbar region 220 may be configured to deploy in case of an event. In examples, in case of an event, the multipurpose seatback bladder system 120 may be configured to adjust the pressurization of the one or more lumbar inflatable bladders 206L to function as a safety system in coordination, harmonization, and or synchronization with one or more additional inflatable bladders 206 deployed in seatback 124 configured to increase the stiffness of the seatback and thus expedite the engagement of the energy absorption material.

Figure 2E:
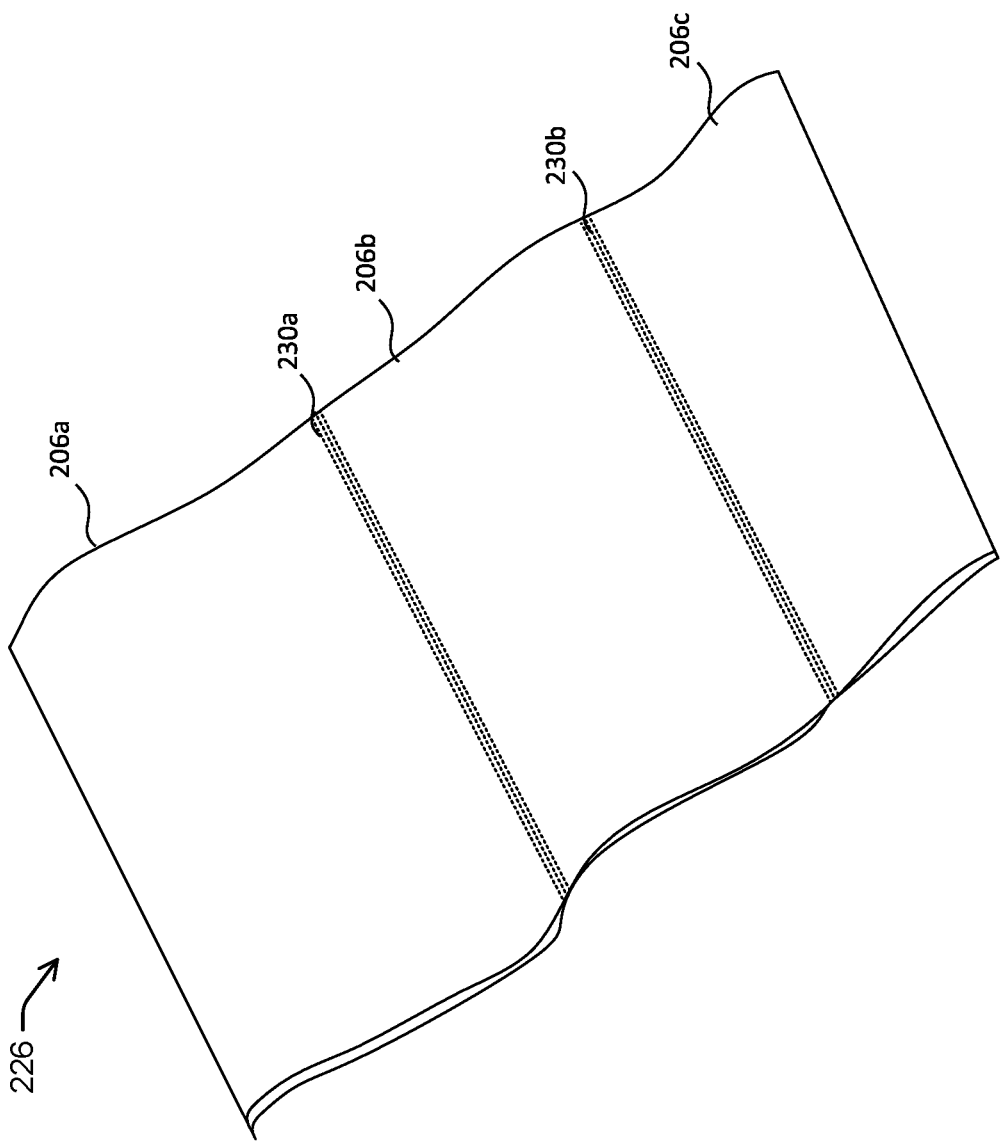

In examples, multipurpose seatback bladder system 120 may include two or more inflatable bladders 206 that are connected to each other. In examples, as shown in FIG. 2E, the multipurpose seatback bladder system 120 may include a contiguous bladder structure 226 divided into two or more individual inflatable bladders 206a, 206b, and 206c. The illustration of three individual inflatable bladders is simply an example. In examples, the contiguous bladder structure 226 may include only two individual inflatable bladders or more than three individual inflatable bladders. In examples, contiguous bladder structure 226 may extend across one or more regions 218, 220, and 222 of seatback 124. In examples, contiguous bladder structure 226 may be positioned so that one or more individual inflatable bladders may be located at a particular region. For example, contiguous bladder structure 226 may be positioned and/or configured such that at least one individual inflatable bladder is located at the lumbar region 220. In examples, contiguous bladder structure 226 may be positioned and/or configured such that at least one individual inflatable bladder is located at the lumbar region 220, and at least one other individual inflatable bladder is located at a thoracic region 222 and/or at pelvic region 218. In examples, the individual inflatable bladders of a contiguous bladder structure 226 may be separated by one or more seams 230 (e.g., 230a and 230b). In examples, a seam 230 may include a weaved material, stitching, hook-and-loop fastener like Velcro, adhesive, a mechanical separator such as a clip or like constricting mechanism, or any like structure.

In examples, as shown in FIG. 2E, one or more seams 230 may be configured to separate the one or more individual inflatable bladders located in the lumbar region from the one or more individual inflatable bladders located at regions other than the lumbar region.

Figure 2F:
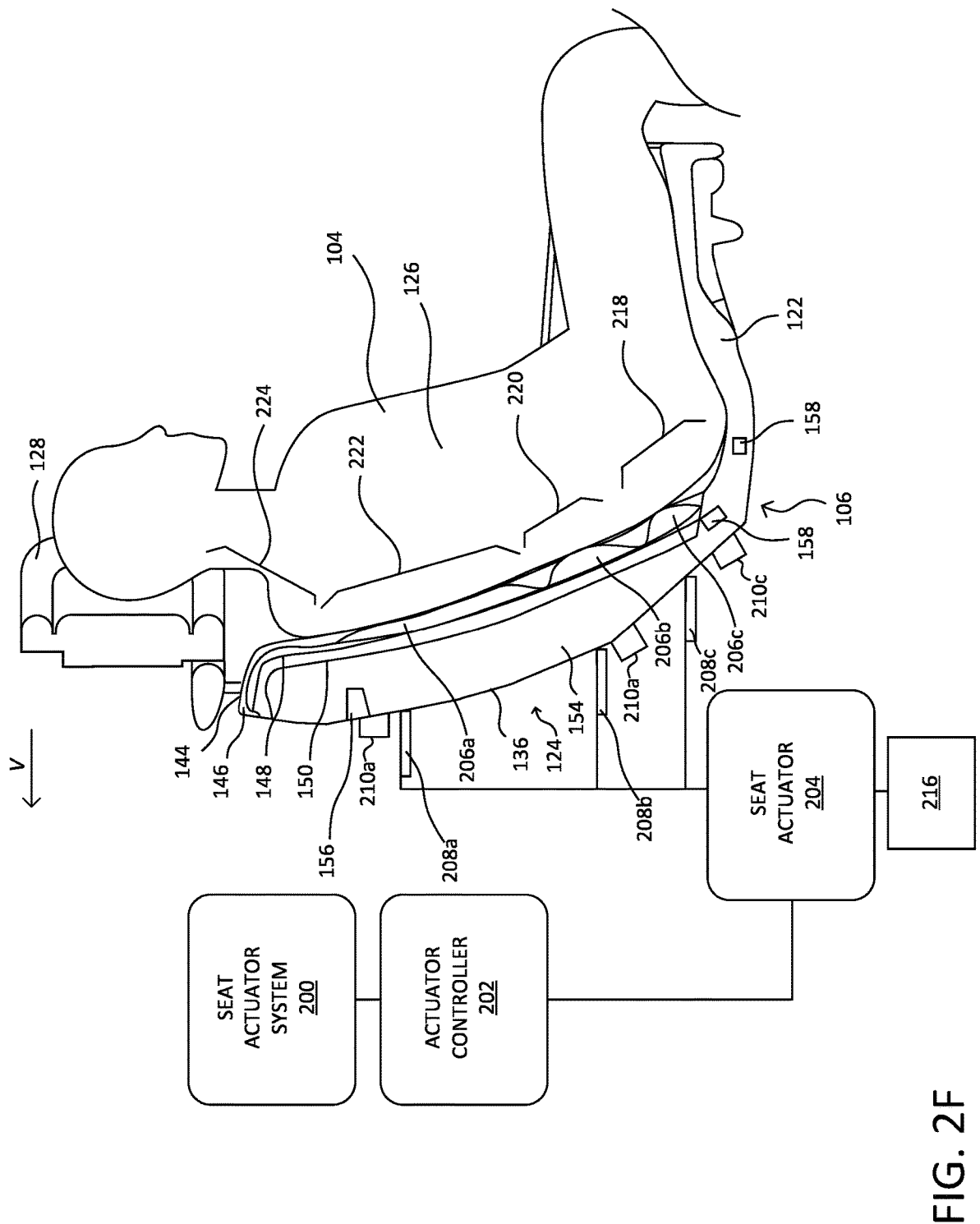

In examples, as shown in FIG. 2F, a seam 230 may be configured to maintain the individual inflatable bladders separate under any operating conditions. For example, a contiguous bladder structure 226 having one or more seams 230 defining two or more individual inflatable bladders may be configured to allow inflation of one or more individual inflatable bladders 206 independent of the inflation or deflation of other individual inflatable bladders. In examples, in case of an event, each individual inflatable bladder may be independently inflated. For example, one or more inflatable bladders 206b located in the lumbar region may be inflated and/or deflated independently of others inflatable bladders. For example, individual inflatable bladders 206a, 206b, and 206c may be separately inflated in case of an event and remain separately inflated bladders. In examples, in case of an event, the individual inflatable bladders may be simultaneously, yet independently, inflated. In examples, one or more individual inflatable bladders may be independently deflated. In examples, inflation and deflation of each separate inflatable bladders is controlled independently.

Figure 2G:
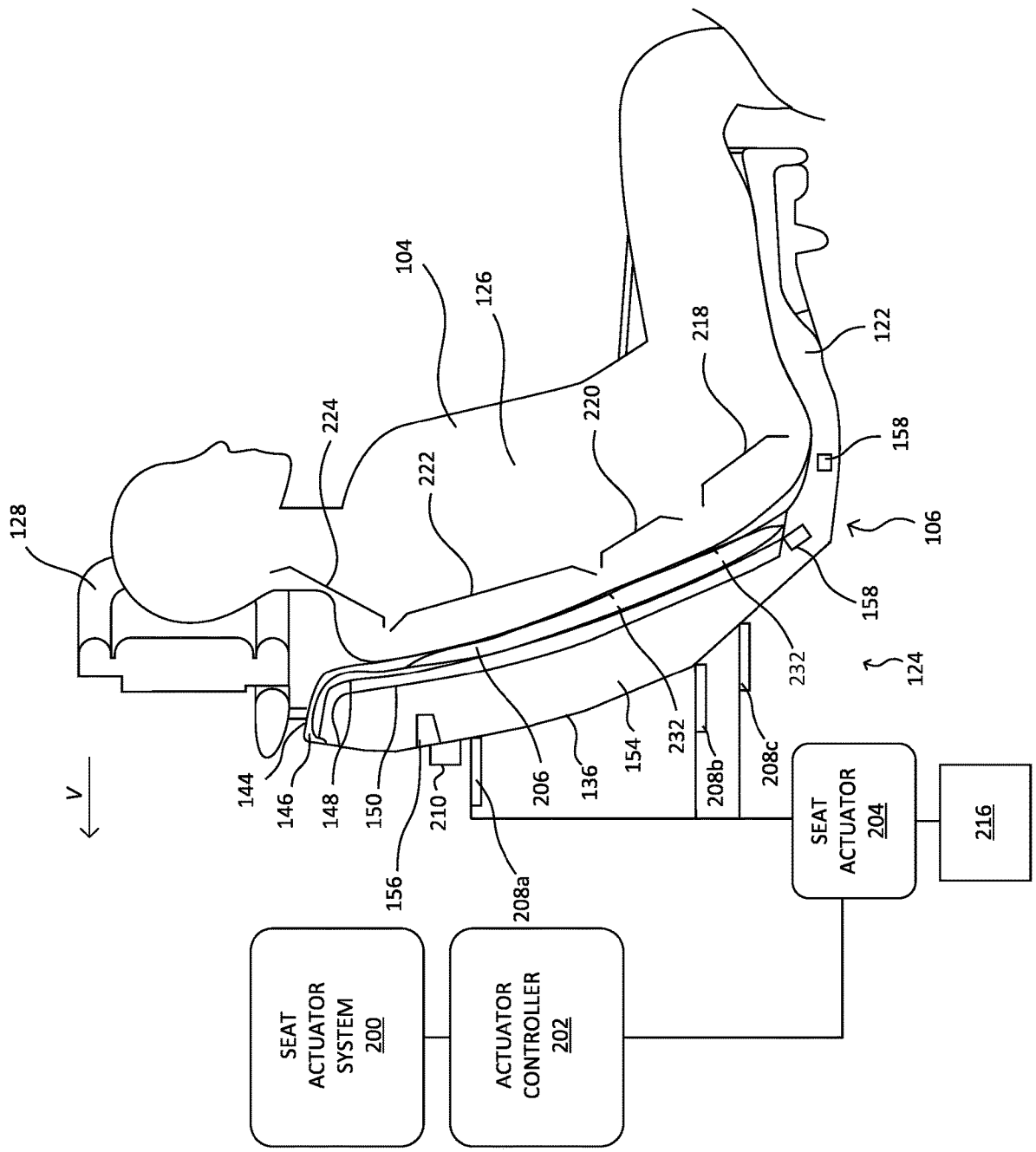

In examples, as shown in FIG. 2G, a seam 230 may be configured to allow flow between two or more individual inflatable bladders at desired instances. For example, seam 230 may be configured to come undone or open when the pressure inside at least one individual inflatable bladder defined by the seam 230 reaches or exceeds a threshold pressure. In examples, a seam 230 may include stitching configured to tear or loosen, a weaved fabric configured to separate, an adhesive configured to detach, a mechanical separator configured to yield, or any combination thereof when the pressure of an adjacent inflatable bladder exceeds a threshold pressure. In examples, seam 230 may be configured to come undone or open in case of an event where inflatable bladders also outside the lumbar region inflate. In examples, all seams 230 in a contiguous bladder structure may come undone in case of an event. In examples, in case of an event, the one or more seams 230 come undone or open and the two or more individual inflatable bladders are connected to form one large contiguous inflatable bladder that extends across one or more regions of the seatback 124.

For example, as shown in FIG. 2G, in case of an event, one or more seams 230 may come undone and/or open to allow inflation of two or more inflatable bladders 206 that are part of a contiguous bladder structure 226. In this manner, it may be possible to inflate the contiguous bladder structure 226 as one contiguous inflatable bladder extending across one or more regions of seatback 124. As illustrated in FIG. 2G, when inflated the one or more seams 230 are shown as broken or pulled apart seam ends 232. This is only an illustration.

In examples, in cases where a seam 230 comes undone or opens, service may be required to replace the contiguous bladder structure 226. In the alternative, in examples, the seam 230 may be reversible and after the seam 230 comes undone or opens, the seam 230 may be configured to return to its closed state after the individual inflatable bladders are deflated and again separate the contiguous bladder structure into two or more individual inflatable bladders. For example, the seam 230 may include a mechanical separator that returns to a stowed or undeployed state, an adhesive that is able to bond again after being detached, a hook-and-loop fastener that is able to reconnect after it has been pulled apart or opened or any like device.

Figure 2H:
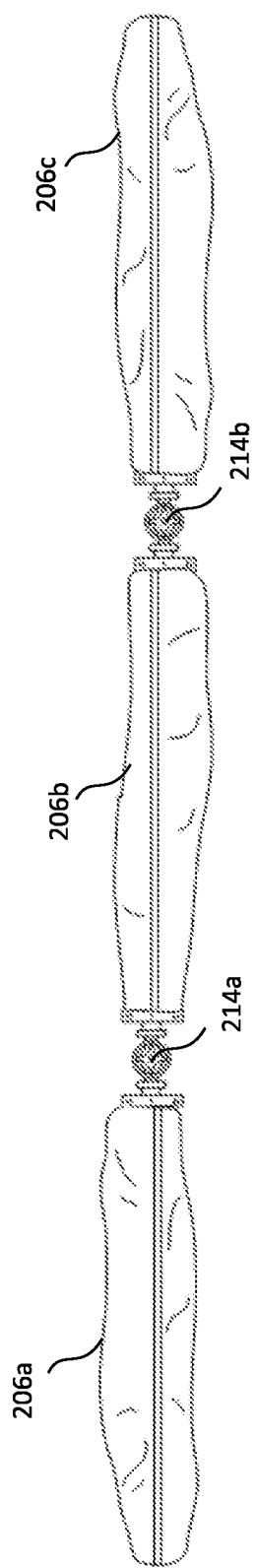

In examples, the multipurpose seatback bladder system 120 may include two or more inflatable bladders 206 connected by one or more valves instead of being part of a contiguous bladder structure 226 as previously described. In examples, as illustrated in FIG. 2H, the multipurpose seatback bladder system 120 may include multiple inflatable bladders 206a, 206b, 206c connected by one or more valves 214 (e.g., 214a and 214b). In examples, one inflatable bladder may be connected to at least one other inflatable bladder by one or more valves 214. In examples, multiple inflatable bladders may be connected in series and located in seatback 124 to extent to one or more regions of seatback 124. For example, inflatable bladders 206a, 206b, and 206c may be arranged in seatback 124 to extent across one or more of the pelvic region 218, lumbar region 220, and thoracic region 222. In examples, the inflatable bladders 206a, 206b, and 206c extend at least across the lumbar region 220 and across at least one additional region such as pelvic region 218 and/or thoracic region 222. Although FIG. 2H shows only three inflatable bladders, what is illustrated is only an example and fewer or more inflatable bladders may be provided. In examples, a valve 214 may be configured to allow flow between inflatable bladders it connects when the pressure inside one connected inflatable bladder is above at threshold pressure. In examples, a valve 214 may be a one-way valve allowing flow only in one direction. In examples, a valve 214 may be configured as a one-way valve to allow flow only toward the inflatable bladder that is closer to the lumbar region. In examples, a valve 214 may be configured as a one-way valve to allow flow only toward the inflatable bladder that is farther from the lumbar region. In examples, a valve 214 is a two-way valve. In examples, during normal vehicle operation, the one or more bladders located at the lumbar region may be configured to reversible inflate and deflate based on a control input. In examples, the one or more inflatable bladders located at regions other than the lumbar region may be configured to inflate in case of an event. In examples, one or more inflatable bladders located at regions other than the lumbar region may be reversibly or irreversibly inflatable. In examples, during normal vehicle operation, the degree of inflation of one or more inflatable bladders located in the lumbar region may be controlled via an input command as previously described. In examples, in case of an event, the one or more inflatable bladders, including those in the lumbar region and in the other one or more regions, may be inflated to prevent injury to an occupant by causing earlier engagement of the energy absorption material.

Figure 3:
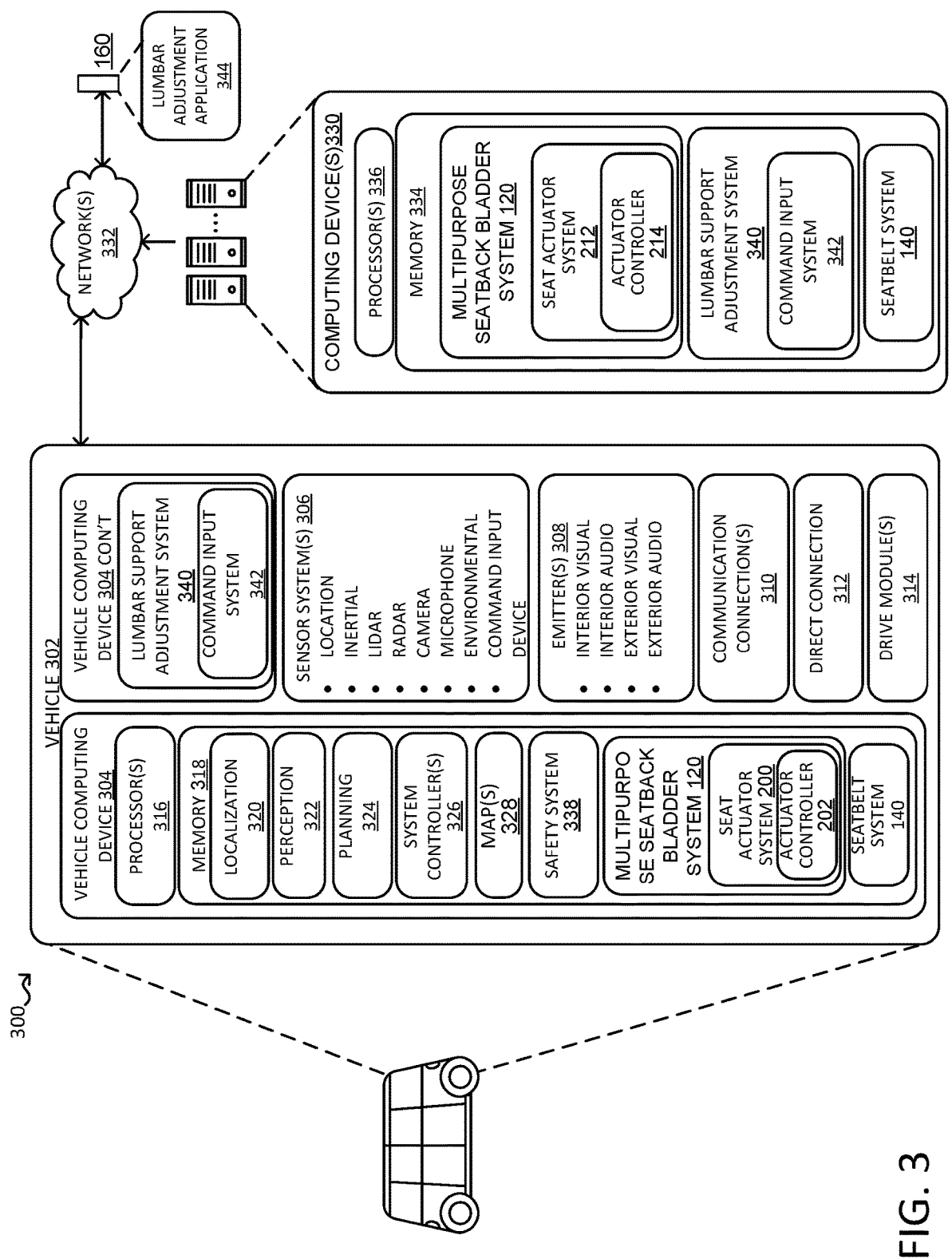
FIG. 3 is a block diagram of an example system architecture for implementing the example techniques described herein.

In examples, vehicle 102 can include an object classification system as described in conjunction with FIG. 3, and/or other portions of vehicle systems like one or more sensors 158 may be configured to generate signals indicative of the presence or absence of an occupant, the weight of an occupant, the size of an occupant such as a height, sitting height, and/or width of an occupant, the sitting position of an occupant, the direction an occupant may be facing, for example, in the direction of travel or opposite the direction of travel, the presence of a riding aid device, such as a child car seat, or any combination thereof. In examples, the additional parameters listed can be monitored or derived from the information captured by the existing sensors and monitors as described herein with respect to vehicle 102 or may also be monitored or derived from readings using one or more sensors 158. The one or more sensors 158 can be located anywhere inside or outside vehicle 102. In examples, one or more sensors 158 may be located in seat base 122, in seatback 124, or both. The one or more sensors 158 can be configured as part of one or more perception component 322, sensor system(s) 306, vehicle computing device(s) 304 and/or computing device(s) 330. The one or more sensors 158 can be in communication with vehicle computing device(s) 304, computing device(s) 330, multipurpose seatback bladder system 120, instructions for seat actuator system 200, or any combination thereof.

In examples, the one or more inflatable bladders 206 can be deployed one or more times. In examples, one or more inflatable bladders 206 can be replaced after deployment. In examples, one or more inflatable bladders 206 can be reversibly operated, i.e. can be configured to deflate after deployment and return to their pre-deployment or stowed state ready to be reinflated. In their stowed state, i.e. prior to deployment, the one or more inflatable bladders 206 may be deflated or unpressurized. In examples, in their stowed stated one or more inflatable bladders 206 are empty or substantially empty. In examples, when in the stowed stated, no foam or comfort material and no energy absorbing material is present inside the one or more inflatable bladders 206.

In some examples, the seat actuator 204 may include one or more expansion devices 208. For example, the seat actuator 204 may include an expansion device operably connected to and/or in flow communication with an interior of an inflatable bladder 206 and configured to increase pressure in the interior of an inflatable bladder 206. In examples, as illustrated in FIG. 2A, one expansion device 208 is in flow communication and/or operably connected to one inflatable bladder 206. In examples, one expansion device 208 may be in flow communication and/or operably connected to two or more inflatable bladders 206. In examples, each expansion device 208 may be in flow communication and/or operably connected to a separate inflatable bladder 206. For examples, as shown in FIGS. 2B-2D, a first expansion device 208a may be in flow communication and/or operably connected to one or more inflatable bladders 206 and/or 206G located outside of the lumbar region 220 of seatback 124, while expansion device 208b may be in flow communication and/or operably connected to one or more inflatable bladders 206L located at lumbar region 220. Also, for example, as shown in FIG. 2F, separate expansion devices 208a, 208b, and 208c may be in flow communication and/or operably connected to respective inflatable bladders 206a, 206b, and 206c.

In some examples, the expansion device may include, a compressor, pump, inflator, pressure reservoir, pneumatic cylinder, gas generator, pyrotechnic charge, propellants, any combination thereof, and/or any other suitable devices or systems. In examples, the one or more expansion devices 208 are inflators. The one or more expansion devices 208, once triggered, can use inflating media such as solid fuel, compressed fluid such as liquid or gas, or any combination thereof to produce rapidly expanding gas to inflate the one or more inflatable bladders 206.

In examples, at least the one or more expansion devices 208 operably connected to one or more inflatable bladders 206 located at the lumbar region 220 of seatback 124 include a reversible device such as a compressor. This may allow for the repeated adjustment of the lumbar support of seatback 124 as may be desirable during normal vehicle operation. In examples, one or more expansion devices 208 may include a compressor used for other uses within vehicle 102. In examples, an expansion device 208 may include a compressor that is used for sensor cleaning or other uses as for example described in co-pending U.S. application Ser. No. 17/553,601, filed on Dec. 16, 2021, and/or in co-pending U.S. application Ser. No. 16/864,146, filed Apr. 30, 2020, both of which are incorporated herein by reference in their entirety. In examples, the one or more expansion devices 208 operably connected to one or more inflatable bladders 206 located at or extending to regions other than the lumbar region may also include a reversible device such as a compressor so that inflation and deflation of these additional inflatable bladders may be conducted without requiring service after every event. Also, in examples, having a reversible expansion device 208 operably connected to the one or more inflatable bladders meant to be deployed during an event may allow more flexibility to the vehicle system to pre-deploy and thus stiffen the seatback 124 in anticipation of an event as the vehicle system would then be able to return the pre-deployed bladders to their stowed position without requiring service. In examples, the ability to pre-deploy may provide for a perceptible safety feature of the seatback where an occupant can feel the stiffening of the seat as the vehicle determines an event, which as previously described, may include an anticipated change of velocity and/or anticipated collision. In examples, the vehicle 102 may communicate to the occupant that an event has been determined by stiffening at least in part the seatback 124. In examples, where the anticipated event does not occur a reversible system may allow deployed inflatable bladders to return to their stowed state, deflated state, and/or to a state in which the one or more inflatable bladders were prior to the event. Similarly, in examples, after an event has occurred, the vehicle system may case the inflatable bladders to return to their stowed state and/or pre-event state so that they may be used again in the future without requiring service.

In examples, the vehicle system may determine a probability of the occurrence of an event and reversibly trigger one or more inflatable bladders to enhance occupant safety based on the probability meeting a threshold level. For example, the vehicle system may continually and/or periodically determine, based on one or more sensor data, the probability of the occurrence of an event. In examples, the vehicle system may trigger deployment of one or more inflatable bladders to enhance occupant safety based on the probability meeting a predetermined threshold. As the vehicle continues to collect sensor data, the vehicle system may modify the probability of the event. In examples, where the probability of an event reaches a first threshold, the vehicle system may cause at least an initial inflation of one or more inflatable bladders to enhance occupant safety. In examples, the initial inflation may be a gradual inflation over a period of time, partial inflation, or a combination thereof. In examples, if the vehicle system determines that the probability of the event reaches a second, higher threshold, the vehicle system may cause the one or more inflatable bladders to fully (or at least additionally) and rapidly deploy to enhance occupant safety. In examples, if the probability of the event does not reach a second threshold the vehicle system may cause the partial and/or gradual deployment to remain engaged. In examples, if the probability of the event does not reach a second threshold and instead falls back below the first threshold, the vehicle system may cause the one or more inflatable bladders deployed to enhance safety to return to their pre-deployed stated. In examples, the one or more inflatable bladders located in the lumbar region 220 of seatback 124 that have been inflated and/or deflated to enhance occupant safety may return to the pre-event state to provide rider comfort. In this manner, in examples, as the occupant experiences the ride, the occupant may feel the seatback 124 stiffening and/or softening based on the degree of probabilities of an event.

In examples, the one or more expansion devices 208 may be reversable or be configured to be operated in reverse. In examples the one or more expansion devices 208 may be configured to be operated to exhaust and/or to deflate the one or more inflatable bladders 206. For example, the one or more expansion devices 208 can be triggered to exhaust any inflating media from one or more inflatable bladders 206. The one or more expansion devices 208 may be operably connected to and/or in flow communication with one or more fluid and/or solid fuel sources 216. The one or more expansion device 208 may be located in any convenient location. In examples, one or more expansion devices 208 are located in seatback 124 at a location that is off-center with respect to back 126 of a seated occupant 104. In examples, one or more expansion devices 208 are located in seatback 124 outside an area against which at least a portion of back 126 of an occupant 104 presses during a collision or change of velocity event of a vehicle 102.

The inflating media used by the one or more expansion devices 208 can be a fluid such as a liquid, a gas, or a combination thereof. The inflating media used by the one or more expansion devices 208 can be a solid fuel. In examples, one or more expansion devices 208 can use combination of fluid and solid. The inflating medium can be a single compound, a mixture of compounds, or a solution. In examples, the fluid can be air. In examples, the fluid can be argon gas. In examples, the fluid can be nitrogen. In examples the fluid can be liquid nitrogen. In examples the fluid can be $CO_2$, for example compressed carbon dioxide. In examples the solid fuel can be sodium azide.

The inflation media can be any can be any suitable source 216. Source 216 may be configured as a single source, or more multiple sources (e.g. 216a and 216b). In examples, source 216 may be configured as a system that draws from one or more locations. For example, source 216 may draw any combination of gas, liquid, or solid from one or more locations. Different sources may be combined in the process of being delivered to inflatable bladder 206 by an expansion device 208. In examples, the source 216 may be configured as one or more containers. In examples, the source 216 may be configured as one or more rechargeable containers. In examples the source 216 may be configured as one or more replaceable containers. A container can include a fluid, a solid, or a combination thereof. In examples, source 216 can be a container such as a canister. In examples, the canister can be a rechargeable canister, a replaceable canister, or both. The canister can be of compressed gas, compressed liquid, or a combination thereof. In examples, a source 216 including a compressed gas, compressed liquid, or a combination thereof may also include a release valve 212. A release valve 212 may include any valve that may be triggered to allow pressurized fluid to flow to partially or fully deploy one or more of the inflatable bladders 206. In examples, release valve 212 may be a solenoid valve. Other types of valves may also be employed. In examples, the source 216 can be the atmosphere. For example, expansion device 208 may be configured to aspirate air from the environment and inject it into bladder 206. In examples, the aspiration and injection can be carried out simultaneously. In examples, the aspiration can occur prior to injection and be held in a storage container ready for injection.

In examples, a source 216a may include a compressed gas, compressed liquid, or a combination thereof configured to be released by a valve 212 such as a solenoid valve. In examples, the release of compressed gas and/or liquid by a valve 212 from a source 216a may enhance the speed at which an inflatable bladder 206 may be inflated. For examples, where the expansion device 208 for an inflatable bladder 206 is a compressor configured to enable reversable pressurization of the inflatable bladder 206, the inflation speed provided by the compressor may not be sufficiently high to quickly inflate the inflatable bladder to provide occupant safety. In examples, the source 216a may be fluidly connected to one or more inflatable bladders 206 via valve 2122 and, in case of an event the valve 212 can be opened to use the source 216a to inflate the one or more inflatable bladders 206. In examples, the opening of the valve 212 of source 216a may bypass expansion device 208 and/or enhance flow through expansion device 208 to release the pressurized gas and/or liquid from source 216a in a pressurized flow of the gas and/or liquid from source 216a to the inflatable bladder 206. In examples, the source 216a may be recharged and/or replaced (e.g., repressurized and/or refilled with fluid) after deployment. In examples, the expansion device 208, such as a compressor, may recharge source 216a either prior to the vehicle staring a new trip, and/or during normal vehicle operation.

In examples, expansion device 208 and a valve 212 at source 216 may also be used together or separately to operate one or more inflatable bladders 206 to improve rider comfort by adjusting lumbar support. In examples, the vehicle system may monitor the pressure maintained for a pressurized gas and/or liquid of source 216a using one or more vehicle sensors. In examples, the vehicle system may allow for utilization of a pressurized gas and/or liquid from a source 216a to modify lumbar support for improving rider comfort when the pressure of the gas and/or liquid at a source 216a is above a threshold and to use an alternative source 216b when the pressure at 216a is below the threshold. Alternative source 216b may be the same type of source or a different type of source from source 216a, and may include pressurized gas and/or liquid, ambient air, or any other suitable inflation source. Although not illustrated, alternative source 216b may also include a release valve 212. In this manner, the system may ensure that a sufficient amount of compressed gas and/or liquid is available from at least one source, such as source 216a, to use in case of an event where the one or more inflatable bladders 206 of the multipurpose seatback bladder system 120 are to be deployed to enhance occupant safety as described earlier.

In some examples, seat actuator 204 may include one or more vents 210 configured to release pressure inside one or more bladders 206 before, during and/or after compression of the seatback 124. For example, the at least one vent 210 may be operably connected to or in flow communication with the one or more inflatable bladders 206. In examples where two or more inflatable bladders 206 are used, as shown in FIG. 2A, each of inflatable bladder 206a, 206b, and 206c may be associated with its own vent 210a, 210b, and 210c respectively. In examples, a vent 210 may also be operably connected to and/or in flow communication with two or more inflatable bladders 206. In examples, one or more vents 210 can be in flow communication with an outer portion seatback 124. In examples, one or more vents 210 can be in flow communication with one or more features 156, such as for example an air pocket.

In examples, the at least one vent 210 may be configured to affect the stiffness characteristic of the seatback 124 before, during and/or after compression of the seatback 124 in the case of an event. In some examples, the at least one vent 210 may be configured as one or more valves configured for controlled passage of air and/or fluid (e.g., a gas and/or fluid) through the one or more valves. In some examples, the one or more valves may be configured (e.g., via size and/or adjustment) to provide a desired stiffness characteristic for the seatback 124 during an event, for example, such that, in combination with the one or more layers, sections, structures, or portions of seatback 124, as at least a portion of the back 126 of the occupant 104 pushes against the first or front surface 132 of the seatback 124 and the seatback 124 is at least partially compressed, a reaction force from the seatback 124 against the portion of the back 126 of the occupant 104 increases from a minimal reaction force (e.g., zero force) to a first reaction force. The dissipation rate of a vent 210 is not limited to a particular range. In examples, a vent 210 can be configured to have a dissipation rate of about 0.06 liters/second. In exemplary embodiments, the dissipation rate may be controlled. Control can be applied to the vent 210 through one or more valves. In exemplary embodiments, controlling dissipation rate can help more gradually distribute the reaction forced against at least a portion of back 126 of occupant 104.

In examples, one or more vents 210 may be connected to one or more inflatable bladders located in the lumbar region of seatback 124. In examples, the one or more vents 210 connected to one or more inflatable bladders located in the lumber region of seatback 124 may be controlled independent of vents connected to inflatable bladders located at other regions of seatback 124. In examples, during normal vehicle operation, the one or more vents 210 connected to one or more inflatable bladders located in the lumbar region of seatback 124 may be controlled to allow for adjustment of the pressure in the one or more inflatable bladders located in the lumber region of seatback 124 based on a control input. For examples, during normal vehicle operation, in response to an input command, the one or more vents 210 connected to one or more inflatable bladders located in the lumbar region of seatback 124 may be configured to regulate the outflow from the one or more inflatable bladders located in the lumbar region of seatback 124. In examples, even though configured to be independently controlled via a control input during normal vehicle operation, the one or more vents 210 connected to one or more inflatable bladders located in the lumbar region of seatback 124 may be configured to operate as previously described in case of an event like other vents connected to other inflatable bladders in seatback 124.

As shown in FIG. 2A, in examples, the multipurpose seatback bladder system 120 may include a seat actuator system 200 including an actuator controller 202 configured to cause inflation and/or deflation of one or more of the inflatable bladders 206 located in at least a portion of the seatback 124. In examples, actuator controller 202 may be configured to cause a stiffness of at least a portion of the seatback 124 to increase. In some examples, the actuator controller 202 may be configured to receive one or more triggering signals from one or more sensors, the lumbar support adjustment system, the safety system, the planning system, or any combination thereof. In examples, the one or more triggering signals may be in response to a control input. In examples, the triggering signal may be indicative of an event, such as for example, a change in velocity of the vehicle, a predicted change in velocity of the vehicle, a collision, or a predicted collision. In examples, based at least in part on the one or more triggering signals, actuator controller 202 may cause a seat actuator 204 to inflate or deflate one or more inflatable bladders 206 located in seatback 124. In examples, in response to a control input during normal vehicle operation, actuator controller 202 may cause seat actuator 204 to increase or decrease the inflation pressure of one or more inflatable bladders located at a lumbar region of seatback 124. In examples, in response to a triggering signal generated during an event, the actuator controller 202 may cause seat actuator 204 to inflate one or more inflatable bladders 206 to increase the stiffness of at least a portion of the seatback 124 that is being or is about to be compressed by back 126 of the occupant 104, for example, as described herein.

In examples, the stiffness at least at a portion of seatback 124 may be increased by compressing at least a portion of a comfort foam or comfort material in seatback 124. In case of an event, the actuator controller 202 may receive one or more signals indicative of parameters other than the one or more signals indicative of a predicted or actual collision, and, based at least in part on the one or more signals indicative of the other parameters, cause the seat actuator 204 to modify the inflation profile the one or more inflatable bladders 206 in at least a portion of the seatback 124 against which at least a portion of the back 126 of the occupant 104. In examples, deployment of one or more inflatable bladders 206 can cause compression of at least a portion of a comfort foam or comfort material located in seatback 124.

In some examples, the seat actuator system 200 may be configured to cause an increase a stiffness of at least a portion of seatback 124 by inflating one or more inflatable bladders 206 before, during, and/or after the reduction in velocity of the vehicle 102 due to braking and/or a collision. In examples, seat actuator system 200 may be configured to cause deployment of seat actuator 204 before an event occurs. In examples, the deployment of seat actuator 204, and thus of one or more bladders 206 can be at time of detection of a braking or of a collision, or of a predicted collision, at time equal −400 ms. In examples, the deployment occurs at the time of a change in velocity or collision event at time equal to 0 ms. In examples, the deployment can follow the reduction in velocity or collision event.

In examples, in case of an event full deployment of the one or more inflatable bladders of the multipurpose seatback bladder system can occur quickly. In examples, deployment occur from time at 0 ms to time 10 ms. In examples, full deployment of an inflatable bladder 206 may be designed to occur in 10 ms. In examples, deployment can be only partial deployment. In examples, deployment can be gradual. In examples, deployment can be delayed. In examples, the time to deploy may be shorter or longer than 10 ms.

In examples, the multipurpose seatback bladder system 120 with actuator system 200 and seat actuator controller 202 may be configured to control deployment and/or rate of deployment of one or more inflatable bladders 206 during an event may be based on a set of deployment parameters. Rate of deployment refers to the speed at which one or more bladders 206 are pressurized. Deployment refers to the full or partial deployment of seat actuator 204. In examples, where seat actuator 204 is configured to have two or more inflatable bladders 206, deployment in case of an event or predicted event may include the selective deployment of one or more inflatable bladders 206, the delayed deployment of one or more inflatable bladders 206 as compared to other inflatable bladders 206, or any combination thereof. In examples, actuator system 200 and/or seat actuator controller 202 may control depressurization or deflation of one or more inflatable bladders 206.

In examples, one or more vehicle system(s) can be configured to determine one or more conditions associated with the triggering event. The seat actuator system 200 and/or actuator controller 202 may be configured to determine, based at least in part on the one or more conditions associated with the triggering event, a pressure to which to inflate one or more inflatable bladders 206. In examples, the multipurpose seatback bladder system 120 may be configured to determine deployment control, pressurization control, depressurization control, or any combination thereof based on the type of event being detected or predicted, the gravity of the event, presence of the occupant, facing direction of the occupant, the position of the occupant, the size of the occupant, the presence of a riding aid device, such as a child car seat, an override input by an occupant or user, or any combination thereof. An object classification system and/or other portions of vehicle systems may generate signals indicative of whether an occupant is present in a seat of the vehicle, what direction the occupant may be facing, and other information about the occupant such as size and weight. In some examples, one or more signals can be indicative of the seat in which the occupant is seated. This can help determine whether the occupant is facing the direction of travel or opposite the direction of travel. Information can be monitored via one or more sensors 158, perception component 322, sensor system(s) 306, through the vehicle computing device(s) 304 and/or computing device(s) 330 as discussed earlier, or any combination thereof.

In examples, determination, based at least in part on the one or more conditions associated with the triggering event, of a pressure to which to pressurize or inflate and/or depressurize or deflate one or more inflatable bladders 206 can be made by one or more vehicle system(s), such as by localization component 320, perception component 322, planning component 324, and/or safety system 338. In such examples, the control instructions may then be communicated to seat actuator system 200 of the multipurpose seatback bladder system 120. The control instructions can be communicated in addition to or be embedded or inherent to a triggering signal sent to the multipurpose seatback bladder system 120.

In examples, seat actuator system 200 and/or seat actuator controller 202 may cause or be instructed to cause deployment of seat actuator 204 to inflate one or more inflatable bladders 206 with less pressure when a lighter occupant, such as child, is detected as the occupant then when a much heavier occupant, such as a full grown adult, is the occupant. In examples, one or more weight thresholds to classify an occupant as light, average, or heavy for purposes of deployment control.

In examples, seat actuator system 200 may be configured to cause one or more inflatable bladders 206 in the lumbar region of the seatback 124 to pressurize in response to an input command independent of additional detected conditions. In examples, in case of an event, seat actuator system 200 may be configured to cause one or more inflatable bladders 206 to pressurize at the same pressure independent of additional detected conditions.

In examples, seat actuator system 200 may prevent deployment of seat actuator 204 to inflate one or more inflatable bladders 206 when the change in velocity or collision event is minor. In examples, seat actuator system 200 may be configured to include one or more threshold indicators based on which seat actuator system 200 can determine whether to cause deployment of seat actuator 204.

In examples, in case of an event the determination to deploy seat actuator 204 based on the degree of change in velocity or collision event, based for example on one or more threshold indicators as described above, can be made by one or more other vehicle system(s), such as by one or more of the sensor system(s) 306 of the vehicle, localization component 320, perception component 322, planning component 324, and/or safety system 338, instead of by seat actuator system 200. In such an example, the one or more threshold indicators may be included in one or more other vehicle system(s), and seat actuator system 200 of multipurpose seatback bladder system 120 can cause deployment of seat actuator 204 in direct response to the triggering signal by one or more of the other vehicle system(s).

Examples of threshold indicators may signal the presence of an occupant, a magnitude of a velocity change, a force of impact in a collision, the direction of a collision relative to the vehicle, a force applied onto the occupant in view of the change in velocity or collision event, a velocity of the vehicle, a direction of the vehicle, a pose of the vehicle, the size of the occupant, a weight of the occupant, the position of an occupant or any combination thereof. Additional datapoints may also be used as thresholds. In examples, in case of an event, the multipurpose seatback bladder system 120 via seat actuator system 200 and/or actuator controller 202 can cause or be directed to cause deployment of seat actuator 204 with less pressure when the magnitude of a change in velocity is below a preestablished threshold or to delay or avoid deployment if a predicted event does not occur within a given time period, or if the event is a minor event. As used herein, a minor event refers to an event in which the reaction forces onto the occupant are below a preestablished threshold.

In examples, seat actuator system 200 and/or actuator controller 202 can control the pressure at which one or more inflatable bladders 206 are inflated. In examples, one or more inflatable bladders 206 are pressurized at about 22 kPa. In examples, one or more inflatable bladders 206 are pressurized at about 10 kPa, 15 kPa, 20 kPa, 25 kPa, 30 kPa, 40 kPa, 50 kPa, 100 kPa, 105 kPa, 200 kPa, or 310 kPa. These pressures are only an example. In examples, one or more inflatable bladders 206 is sufficiently pressurized to compress at least a portion of one or more layers or sections of comfortable foam or comfort material that is proximate, adjacent, or in the vicinity of one or more inflatable bladder 206. In examples, one or more inflatable bladders 206 is inflated to a volume of 0.6 liters.

In some examples, the seat actuator system 200 may be in communication with one or more systems of the vehicle 102 and may be configured to cause activation of seat actuator 204 based at least in part, for example, on one or more signals received from the other systems of the vehicle 102.

In examples, in case of an event the deployment parameters of the seat actuator 204 may be determined prior to the determination of the change in velocity of the vehicle, a predicted change in velocity of the vehicle, a collision, or a predicted collision and saved for use a later instance. In some instances, one or more deployment parameters may be updated continuously or periodically during the ride in the event the user materially changes position (slouches, leans forward, etc.). In some instances, deployment parameters can be determined using one or more sensors of a vehicle (e.g., a vision camera, a contact sensor, a capacitance sensor, etc.). Determining deployment parameters beforehand (e.g., before a predicted collision) may increase a response time to properly deploy the seat actuator in case of an event. Moreover, after this initial determination, it is contemplated that the occupant may manually or electronically control the position of the seat. Despite this adjustment by the occupant, in the event of the predicted collision, the seat actuator may deploy according to the predetermined parameters. In some instances, the deployment parameters may be determined using known characteristic(s) of the occupant and/or a profile (e.g., account) of the occupant, such as height, weight, head size, etc. For example, a vehicle used for mass transportation may communicate with a mobile device of a user or otherwise identify and store a per-user profile including information pertaining to the safe deployment of the seat actuator. In certain instances, the deployment parameters in case of an event may change depending on the seat orientation, seat configuration, characteristics of the occupant (e.g., weight, height, etc.) and/or may be uniquely associated with a specific seating position within a vehicle. For example, deployment parameters may be different between a rearward-facing occupant, a side-facing occupant, and/or a forward-facing occupant within a vehicle. In examples, the seat actuator system 200 and/or the actuator controller 202 may be configured to receive one or more of the above mentioned known characteristic(s) of the occupant and/or profile of the occupant, vehicle information such as direction of travel, seat orientation, configurations or any combination thereof. Based on this information, in examples, the seat actuator system 200 and/or the actuator controller 202 may be configured to adjust deployment parameters for seat actuator 204 in case of an event. For example, seat actuator system 200 and/or the actuaro controller 202 may be configured to receive a seating position of an occupant and a direction of travel of the vehicle, and cause the seat actuator 204 to modify the stiffness of the portion of the seatback based at least in part on one or more of the seating position or the direction of travel.

In some examples consistent with the example shown in FIGS. 2A-2E, in case of an event the reaction force is applied earlier than if no inflatable bladder 206 had been deployed and thus the energy can be absorbed more gradually across the time period of the compression event, for example, during a collision and/or rapid deceleration of the vehicle 102.

In examples, after the event, the multipurpose seatback bladder system 120 can detect and/or determine cessation of the signal triggering the event. In accordance with detecting and/or determining cessation of the triggering signal, the multipurpose seatback bladder system 120 can allow or control the one or more inflatable bladders 206 of the expandable portion of seat actuator 204 to return to their stowed state. In examples, the one or more inflatable bladders 206 are allowed to deflate. In examples, the one or more inflatable bladders 206 may be actively deflated. In examples, active deflation may be carried out by controlling one or more vents 210 to outflow the fluid inside one or more inflatable bladders 206. In examples, a vacuum can be applied to exhaust the fluid inside one or more inflatable bladders 206. For example, a vacuum may be applied through one or more vents 210. In examples, the expansion device 208 may be operated in reverse to extract fluid from inside one or more inflatable bladders 206. In examples, active deflation of the one or more inflatable bladders 206 may be managed and/or controlled by seat actuator system 200 and/or actuator controller 202 via seat actuator 204.

FIG. 3 depicts a block diagram of an example system 300 for implementing the techniques described herein. In at least some examples, the system 300 may include a vehicle 302, which may correspond to the example vehicle 102 shown in FIG. 1. The vehicle 302 may include a vehicle computing device 304, one or more sensor system(s) 306, one or more emitters 308, one or more communication connections 310, at least one direct connection 312, and one or more drive modules 314.

The vehicle computing device 304 may include one or more processors 316 and memory 318 communicatively coupled with the one or more processors 316. In the illustrated example, the vehicle 302 is an autonomous vehicle. However, the vehicle 302 may be any other type of vehicle. In the illustrated example, the memory 318 of the vehicle computing device 304 stores a localization component 320, a perception component 322, a planning component 324, a safety system 338, one or more system controllers 326, one or more map(s) 328, and an example of the logic components of multipurpose seatback bladder system 120. In examples, memory 318 may further include a lumbar support adjustment system 340 configured to generate one or more trigger signals to cause the multipurpose seatback bladder system 120 to inflate or deflate one or more inflatable bladders 206 in the lumbar region of the seatback 124. In examples, lumbar support adjustment system 340 may include command input system 342 configured to enable receipt of a command input by way of input device 160. Though depicted in FIG. 3 as residing in memory 318 for illustrative purposes, it is contemplated that the localization component 320, the perception component 322, the planning component 324, the safety system 338, the one or more system controllers 326, the one or more maps 328, the lumbar support adjustment system 340, and/or the logic components of the multipurpose seatback bladder system 120 may additionally, or alternatively, be accessible to the vehicle 302 (e.g., stored on, or otherwise accessible by, memory remote from the vehicle 302).

Regarding the example system 300 shown in FIG. 3, in at least some examples, the localization component 320 may be configured to receive data from the sensor system(s) 306 to determine a position and/or orientation of the vehicle 302 (e.g., one or more of an x-, y-, z-position, roll, pitch, or yaw). For example, the localization component 320 may include and/or request/receive a map of an environment and may continuously determine a location and/or orientation of the autonomous vehicle within the map. In some examples, the localization component 320 may utilize SLAM (simultaneous localization and mapping), CLAMS (calibration, localization and mapping, simultaneously), relative SLAM, bundle adjustment, non-linear least squares optimization, or the like to receive image data, LIDAR sensor data, radar data, IMU data, GPS data, wheel encoder data, and the like to accurately determine a location of the autonomous vehicle. In some examples, the localization component 320 may provide data to various components of the vehicle 302 to determine an initial position of an autonomous vehicle for generating a candidate trajectory, as discussed herein.

In some examples, the perception component 322 may be configured to perform object detection, segmentation, and/or classification. In some examples, the perception component 322 may provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional and/or alternative examples, the perception component 322 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation (e.g., a roll, pitch, yaw), an entity type (e.g., a classification), a velocity of the entity, an acceleration of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc.

In general, the planning component 324 may determine a path for the vehicle 302 to follow to traverse through an environment. For example, the planning component 324 may determine various routes and trajectories and various levels of detail. For example, the planning component 324 may determine a route to travel from a first location (e.g., a current location) to a second location (e.g., a target location). For the purpose of this discussion, a route may be a sequence of waypoints for travelling between two locations. As non-limiting examples, waypoints include streets, intersections, global positioning system (GPS) coordinates, etc. Further, the planning component 324 may generate an instruction for guiding the autonomous vehicle along at least a portion of the route from the first location to the second location. In at least one example, the planning component 324 may determine how to guide the autonomous vehicle from a first waypoint in the sequence of waypoints to a second waypoint in the sequence of waypoints. In some examples, the instruction may be a trajectory or a portion of a trajectory. In some examples, multiple trajectories may be substantially simultaneously generated (e.g., within technical tolerances) in accordance with a receding horizon technique, wherein one of the multiple trajectories is selected for the vehicle 302 to navigate.

In at least one example, the planning component 324 may determine a location of a user based on image data of an environment received from the user using, for example, bags of binary words with image-based features, artificial neural network, and the like. Further, the planning component 324 may determine a pickup location associated with a location. A pickup location may be a specific location (e.g., a parking space, a loading zone, a portion of a ground surface, etc.) within a threshold distance of a location (e.g., an address or location associated with a dispatch request) where the vehicle 302 may stop to pick up a passenger. In at least one example, the planning component 324 may determine a pickup location based at least in part on determining a user identity (e.g., determined via image recognition or received as an indication from a user device, as discussed herein).

In other examples, the planning component 324 may alternatively, or additionally, use data from the perception component 322 to determine a path for the vehicle 302 to follow to traverse through an environment. For example, the planning component 324 may receive data from the perception component 322 regarding objects associated with an environment. Using this data, the planning component 324 may determine a route to travel from a first location (e.g., a current location) to a second location (e.g., a target location) to avoid objects in an environment. In at least some examples, such a planning component 324 may determine there is no such collision free path and, in turn, provide a path which brings vehicle 302 to a safe stop avoiding all collisions and/or otherwise mitigating damage. In examples, in conjunction with bringing vehicle 302 to a safe stop and/or mitigating damage in case of an event such as a collision or predicted collision, planning component 324 can generate a triggering event signal for multipurpose seatback bladder system 120.

In examples, a safety system 338 may be used in addition to planning component 324 as a redundant safety mechanism to provide a triggering signal to the multipurpose seatback bladder system 120. In examples, the safety system 338 may also generate and/or communicate occupant related information that can be used as a deployment parameter. In examples the generated occupant related information that can be used as a deployment parameter may be communicated to the multipurpose seatback bladder system 120, the seat actuator 200, and/or actuator controller 202.

In examples, the safety system 338 in addition to or in place of the planning component 324 may alternatively, or additionally, use data from the perception component 322, the one or more sensor system(s) 306, and/or the localization component 320, to determine whether a path for the vehicle 302 through an environment will require a sudden change in velocity, a hard stop, or if a collision is unavoidable. For example, safety system 338 may receive data from the perception component 322, the one or more sensor system(s) 306, and/or the localization component 320, regarding objects associated with an environment. Using this data, the safety system 338 may determine a required change in velocity of the vehicle, a predicted change in velocity of the vehicle, a collision, or a predicted collision and, in turn, provide a triggering signal to the multipurpose seatback bladder system 120 and, optionally, to seatbelt system 140.

In examples, in case of an event, the multipurpose seatback bladder system 120 may be configured to work in conjunction with the seatbelt system 140 to ensure that an occupant 104 is not thrown form the seat. In examples, in case of an event, when the multipurpose seatback bladder system 120 is triggered to deploy one or more inflatable bladders to enhance occupant safety, a trigger signal may also be sent to and/or received by the seatbelt system 140 to increase the tension of one or more seatbelts 138 associated with the seat in which the multipurpose seatback bladder system 120 is triggered. In examples, by increasing the tension of one or more seatbelts 138, it may be possible to reduce the slack of the one or more seatbelts 138 in case of an event. In examples, the tension of one or more seatbelts 138 may be increased just before, at the same time, and/or just after inflation of one or more inflatable bladders triggered to enhance safety of the occupant. In this manner, seatbelts 138 can pull in the occupant and/or prevent excursion of the occupant away from the seat that may be due to the inflation of one or more of the inflatable bladders. This, in turn, may further enhance occupant safety.

In examples, planning component 324 and/or safety system 338 may determine an impact location between the vehicle 302 and the object based at least in part on trajectories of the vehicle 302 and/or the object. For example, planning component 324 and/or safety system 338 may determine that the intersection between the vehicle 302 and the object is on a side, front, rear, etc. of the vehicle 302. In some instances, planning component 324 and/or safety system 338 may determine whether the vehicle 302 includes rearward facing occupant(s) and/or forward facing occupant(s) within the vehicle 302, using the trajectory of the vehicle 302 and/or the sensor system(s) 306 and/or sensor 158.

In some instances, planning component 324 and/or safety system 338 may be configured to determine a time associated with a triggering event such as a change in velocity of the vehicle, a predicted change in velocity of the vehicle, a collision, or a predicted collision, or whether the change in velocity of the vehicle, a predicted change in velocity of the vehicle, a collision, or a predicted collision is imminent. The time may be a particular time, such as, for example, 120 milliseconds after 3:05 pm, or it may be a time interval from a time in which change in velocity of the vehicle, a predicted change in velocity of the vehicle, a collision, or a predicted collision was determined. The time may be determined based on a measured closure rate of the object toward the vehicle 302, a velocity of the vehicle 302, an acceleration of the vehicle 302, a velocity of the object, an acceleration of the object, road conditions, weather conditions, and/or other factors that may affect a closure rate of the object toward the vehicle 302, or vice versa. In such instances, planning component 324 and/or safety system 338 may transmit a triggering event signal to the multipurpose seatback bladder system 120, and optionally to seatbelt system 140, in advance, and with enough time, for deployment of the seat actuator 204 prior to the change in velocity of the vehicle, a predicted change in velocity of the vehicle, a collision, or a predicted collision.

In at least one example, the vehicle computing device 304 may include one or more system controllers 326, which may be configured to control steering, propulsion, braking, safety, emitters, communication, and other systems of the vehicle 302. These system controller(s) 326 may communicate with and/or control corresponding systems of the drive module(s) 314 and/or other components of the vehicle 302.

The memory 318 may further include one or more map(s) 328 that may be used by the vehicle 302 to navigate within the environment. For the purpose of this application, a map may be any number of data structures modeled in two dimensions, three dimensions, or N dimensions that are capable of providing information about an environment, such as, but not limited to, topologies (such as intersections), streets, mountain ranges, roads, terrain, and the environment in general. In some examples, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the map may be stored in a tiled format, such that individual tiles of the map represent a discrete portion of an environment and may be loaded into working memory as needed. In at least one example, the one or more maps 328 may include at least one map (e.g., images and/or a mesh). In some examples, the vehicle 302 may be controlled based at least in part on the maps 328. That is, the maps 328 may be used in connection with the localization component 320, the perception component 322, and/or the planning component 324 to determine a location of the vehicle 302, identify objects in an environment, and/or generate routes and/or trajectories to navigate within an environment.

In some examples, the one or more map(s) 328 may be stored on a remote computing device(s) (such as computing device(s) 330) accessible via one or more network(s) 332. In some examples, multiple maps 328 may be stored based on, for example, a characteristic (e.g., type of entity, time of day, day of week, season of the year, etc.). Storing multiple maps 328 may have similar memory requirements but increase the speed at which data in a map may be accessed.

As shown in FIG. 3, in some examples, the logical or control portions of multipurpose seatback bladder system 120, including instructions to control operation of the seat actuator system 200 and instructions to control operation of actuator controller 202 and actuator 204, may be stored in the memory 318 of the computing device 304 of the vehicle 302 or remote from the vehicle 302 in the memory 334 of the computing device(s) 330. In some examples, some portions of the multipurpose seatback bladder system 120 may be stored in the memory 318 of the computing device 304 of the vehicle 302, and other portions of the multipurpose seatback bladder system 120 may be stored remotely in the memory 334 of the computing device(s) 330, and the separately located portions of the multipurpose seatback bladder system 120 may operate together in a coordinated manner.

In some examples, in case of a triggering event, one or more triggering event signals may be generated by components other than or in addition to planning component 324 and/or safety system 338. For example, the one or more of sensor system(s) 306, the localization component 320, or the perception component 322 can also be configured to generate a triggering event signal for multipurpose seatback bladder system 120 and optionally for seatback system 140. In examples, the one or more of sensor system(s) 306, the localization component 320, the perception component 322, the planning component 324, and/or safety system 338 may generate one or more triggering event signals indicative of one or more of an actual change in velocity of the vehicle 302 or a predicted change in velocity of the vehicle 302, for example, due to a change in velocity of the vehicle, a predicted change in velocity of the vehicle, a collision, or a predicted collision involving the vehicle 302. Additionally, or alternatively, the multipurpose seatback bladder system 120 itself may generate the triggering event signal and optionally send the signal to seatback system 140. In examples, the multipurpose seatback bladder system 120 may be configured to generate and send a trigger signal to seatback system 140 when the multipurpose seatback bladder system 120 receives a triggering event signal.

In examples, one or more of the sensor system(s) 306 may generate one or more signals indicative of an object (e.g., another vehicle, a wall, a guardrail, a bridge support, a utility pole, and/or a pedestrian) and communicate the one or more signals to the perception component 322 the planning component 324, and/or safety system 338, which may predict a collision with an object in the environment through which the vehicle 302 is travelling and trigger a signal accordingly.

In examples, upon detection of a triggering event signal from the one or more sensor system(s) 306, localization component 320, perception component 322, planning component 324, and/or safety system 338, seat actuator system 200 of the multipurpose seatback bladder system 120 may be configured to provide one or more signals to the actuator controller 202, which may activate the seat actuator 204 and cause an increase in stiffness of at least a portion of seatback 124. As described herein, in some examples, the seat actuator 204 may cause an increase in stiffness by increasing pressure in or inflating one or more inflatable bladders 206 located in seatback 124, thereby compressing at least a portion of a comfort foam or comfort material in seatback 124 and expedite application of an initial reaction force F to which the occupant 104 is subject through earlier engagement of the energy absorbing material in seatback 124.

In some examples, the seat actuator system 200 and/or actuator controller 202 may be configured to receive one or more occupant presence signals indicative of a presence of an occupant 104 in a seat 106. In some such examples, the actuator controller 202 may be configured to cause, based at least in part on the one or more occupant presence signals, the seat actuator 204 to increase a stiffness of at least a portion of the seatback 124 of the seat 106. In some examples, the seat actuator system 200 and/or actuator controller 202 may be further configured to either receive information or determine, based at least in part on the occupant presence signal, that the occupant 104 is facing rearward (e.g., opposite relative to a direction of travel of the vehicle 302 and/or in the event of a collision or predicted collision the direction opposite to the direction from which vehicle 302 collides or is predicted to collide with an object), and cause, based at least in part on determining that the occupant 104 is facing rearward, the seat actuator 204 to increase pressure in the one or more inflatable bladders. In examples, the perception component 322 of the vehicle 302 may include an object classification system configured to determine information related, for example, to whether an occupant 104 is present in one or more of the respective seats 106 of the vehicle 302. In examples, the information may be provided by safety system 338. In examples, the above information may be received by one or more other vehicle system(s), such as one or more sensor system(s) 306, localization component 320, perception component 322, planning component 324, and/or safety system 338, which may be configured to determine the desired stiffness of at least a portion of seatback 124 and which may be configured to transmit the respective deployment control information to seat actuator system 200 and/or actuator controller 202 of multipurpose seatback bladder system 120 along with or as part of a trigger signal.

In some examples, the object classification system may leverage one or more of the sensor system(s) 306 of the vehicle 302 and determine information about the occupant 104, such as, for example, the size and/or weight of the occupant 104 (e.g., whether the occupant 104 is an adult, a child, or an infant). For example, image systems (e.g., cameras) internal to the vehicle 302 may determine presence of an occupant 104 in a seat 106. One or more sensors 158 as previously described may be used in conjunction with, in place of, and/or be part of perception component 322 or sensor system 306. The information about occupant 104 can be transmitted directly to multipurpose seatback bladder system 120 and/or can be transmitted to one or more vehicle system(s) such as the planning component 324, and/or the safety system 338, which then generate a signal to send to multipurpose seatback bladder system 120.

If, for example, no occupant 104 is present in a seat 106, then it may be determined not activate the seat actuator 204. This may prevent unnecessary activation and prevent costs associated with servicing activated parts of the multipurpose seatback bladder system 120. Alternatively, if an occupant 104 is present in the seat 106, the actuator controller 202 may cause activation of a seat actuator 204 associated with the position of the occupant 104 to protect the occupant 104 during the collision. In at least some examples, the type of occupant 104 detected may be used to inform other parameters of such a system (e.g., lower activation rates or pressures for children or smaller occupants, etc.). In some examples, the seat actuator system 200 and/or other vehicle system(s) such as one or more sensor system(s) 306, localization component 320, perception component 322, planning component 324, and/or safety system 338, may be further configured to determine, based at least in part on the occupant presence signal, that the occupant 104 is facing rearward (e.g., facing the opposite direction to a direction of travel of the vehicle 302 and/or in the event of a collision or predicted collision the direction opposite to the direction from which vehicle 302 collides or is predicted to collide with an object), and have seat actuator system 200 cause, based at least in part on determining that the occupant 104 is facing rearward, the seat actuator 204 to increase the stiffness of at least a portion of the seatback 124 of the seat 106.

The seat actuator system 200, in some examples, may be configured to receive one or more direction signals indicative of a direction of travel of the vehicle 302, and cause, based at least in part on the direction signal, the seat actuator 204 to increase the pressure in one or more inflatable bladders 206. For example, the vehicle 302 may be a bidirectional vehicle configured to travel between locations with either end of the vehicle 302 being the leading end, for example, as described herein with respect to FIG. 1. In such vehicles, a seat 106 may be facing the direction of travel when the vehicle 302 is traveling with one end of the vehicle 302 being the leading end, or may be facing rearward (opposite the direction of travel) when the other end of the vehicle 302 is the leading end. The vehicle 302 may include sensors and/or a system configured to generate one or more signals indicative of whether the vehicle 302 is traveling in a direction such that the seat 106 is facing forward (i.e., in the direction of travel) or the seat 106 is facing rearward (i.e., opposite the direction of travel). The seat actuator system 200 may be configured to prevent activation of the seat actuator 204 associated with the seat 106, even when occupied, for example, when the seat 106 is facing forward based at least in part on the signals. This may prevent unnecessary activation and costs associated with servicing activated parts of the multipurpose seatback bladder system 120. Alternatively, if the seat 106 is facing rearward and an occupant 104 is present in the seat 106, the actuator controller 202 may activate the seat actuator 204 associated with the position of the seat 106 to protect the occupant 104 during the collision, for example, as described herein.

In examples, the above direction information may be received by one of the other vehicle system(s), such as one or more sensor system(s) 306, localization component 320, perception component 322, planning component 324, and/or safety system 338, which may then be configured to, based at least in part on the direction signal, provide deployment instructions to seat actuator system 200 and/or actuator controller 202 to cause seat actuator 204 to increase the pressure in one or more inflatable bladders 206.

In examples, during normal vehicle operation the lumbar support adjustment system 340 may enable control over the inflation and deflation of one or more inflatable bladders 206 located in at least a portion of the lumbar region 220 of seatback 124. In examples, the inflation of one or more inflatable bladders 206 in the lumbar region 220 of seatback 124 may stiffen and potentially extend toward occupant back 126 at least a portion of front surface 132 of seatback 124. In examples, the portion of front surface 132 of seatback 124 being stiffened and/or extended is the portion at or proximate to the lumbar region 220 of seatback 124. By stiffening and/or extending front surface 132 at or proximate to lumbar region 220 of seatback 124, it may be possible to enhance support at that the corresponding location of occupant back 126. This may provide improved lumbar support to occupant 104 and thus improve rider comfort. In examples, deflation of one or more inflatable bladders 206 in the lumbar region 220 of seatback 124 may soften and potentially retract away from occupant back 126 at least a portion of front surface 132 of seatback 124. In examples, the portion of front surface 132 of seatback 124 being softened and/or retracted is the portion at or proximate to the lumbar region 220 of seatback 124. By softening and/or retracting front surface 132 at or proximate to lumbar region 220 of seatback 124, it may be possible to decrease and/or soften the support provided at that the corresponding location of occupant back 126. Adjustment to the lumbar support for a given occupant 104 may improve rider comfort.

In examples, the inflation and/or deflation of the one or more inflatable bladders 206 located at or near lumbar region 220 of seatback 124 may be controlled via lumbar support adjustment system 340. In examples, lumbar support adjustment system 340 may include command input system 342 to enable receipt of command inputs regarding the desired lumbar support adjustment. In examples, command input system 342 may enable interaction with one or more input devices 160. As previously described, one or more input devices 160 may be integrated in vehicle 302, such as a being part of sensor system 306, and/or be a remote device such as part of computing device(s) 330 and/or a separate remote input device 160 such as a portable computer, remote controller, or like device. In examples, a remote input device 160 may be a smart phone or other portable computer as previously described. In examples, a lumbar adjustment application 344 or like logic instructions may be provided in input device 160 to enable interaction with lumbar support adjustment system 340. In examples, the lumbar adjustment application 344 or like logic instructions stored in input device 160 may be an application configured to interact with command input system 342 of vehicle 302. In examples, where the input device 160 is a remote device, lumbar adjustment application 344 or like logic instructions to enable interaction with command input system 342 may be stored in remote input device 160, stored on the cloud or server, stored at vehicle 302, or any combination thereof. In examples, where input device 160 is integrated in vehicle 302, it may also include lumbar adjustment application 344 or like logic instructions stored thereon and/or may be controlled directly by command input system 342 stored on vehicle 302 and/or computing device 330. In examples, any remote input device 160 may be enabled to communicate with the system of vehicle 302 and/or computing device(s) 330 either via a wired or wireless connection as generally described herein.

In examples, input device 160 may include one or more input means such as a touchscreen, keyboard, wheel, microphone for voice command, to receive an input to adjust lumbar support of seatback 124. In examples, the input device 160 may include one or more output means such as a display, speaker, and/or visual alert such as a light diode, to indicate one or more of potential adjustments available, degree of adjustment available, whether maximum adjustment has been reached, unavailability of potential adjustment or any combination thereof.

In examples, based on the input received from input device 160, command input system 342 may be configured to assess the requested input. In response to the assessed requested input, lumbar support adjustment system 340 may generate an adjustment trigger signal for the lumbar region of seatback 124. In examples, the adjustment trigger signal may be received by multipurpose seatback bladder system 120 that may in response thereto activate seat actuator system 200 to cause actuator controller 202 to enable seat actuator 204 to inflate and/or deflate one or more inflatable bladders 206 in or proximate to the lumbar region 220 of seatback 124. In examples, only one or more inflatable bladders 206 located in or proximate to lumbar region 220 are inflated or deflated in response to an adjustment trigger signal while maintaining one or more inflatable bladders located or primarily located at other regions of seatback 124, such as the pelvic region 218 and thoracic region 222 in their undeployed state.

In some examples, aspects of some or all of the components discussed herein may include any models, algorithms, and/or machine learning algorithms. For example, in some examples, the components in the memory 318 and/or the memory 334 may be implemented as a neural network.

As described herein, an exemplary neural network is a biologically inspired algorithm which passes input data through a series of connected layers to produce an output. Each layer in a neural network may also include another neural network or may include any number of layers (whether convolutional or not). As may be understood in the context of this disclosure, a neural network may utilize machine learning, which may refer to a broad class of such algorithms in which an output is generated based on learned parameters.

Although discussed in the context of neural networks, any type of machine learning may be used consistent with this disclosure. For example, machine learning algorithms may include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks, such as, for example, ResNet70, ResNet101, VGG, DenseNet, PointNet, and the like.

In at least one example, the sensor system(s) 306 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time-of-flight (TOF), etc.), microphones, wheel encoders, environment sensors (e.g., temperature sensors, humidity sensors, light sensors, pressure sensors, etc.), etc. The sensor system(s) 306 may include multiple examples of each of these or other types of sensors. For example, the LIDAR sensors may include individual LIDAR sensors located at the corners, front, back, sides, and/or top of the vehicle 302. As another example, the camera sensors may include multiple cameras disposed at various locations about the exterior and/or interior of the vehicle 302. The sensor system(s) 306 may provide input to the vehicle computing device 304. Additionally, or alternatively, the sensor system(s) 306 may send sensor data, via the one or more networks 332, to the one or more computing device(s) 330 at a particular frequency, after a lapse of a predetermined period of time, in near real-time, etc.

In examples, sensor system(s) 306 may include one or more input devices 160 integrated in vehicle 302. In examples, an input device 160 may include a dial, lever, touchscreen, button, keyboard, voice command microphone receiver or any similar input device. In examples, an input device 160 may be operated via command input system 342. In examples, input device 160 may be configured to receive an input command during normal vehicle operation for adjustment of the pressurization of one or more bladders located in the lumbar region of seatback 124.

The vehicle 302 may also include one or more emitters 308 for emitting light and/or sound, as described above. The emitters 308 in this example include interior audio and visual emitters to communicate with passengers of the vehicle 302. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters.

By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which including acoustic beam steering technology.

The vehicle 302 may also include one or more communication connection(s) 310 that enable communication between the vehicle 302 and one or more other local or remote computing device(s). For example, the communication connection(s) 310 may facilitate communication with other local computing device(s) on the vehicle 302 and/or the drive module(s) 314. Also, the communication connection(s) 310 may allow the vehicle 302 to communicate with other nearby computing device(s) (e.g., other nearby vehicles, traffic signals, etc.). The communications connection(s) 310 also enable the vehicle 302 to communicate with a remote teleoperations computing device or other remote services.

In examples, in addition to and/or in place of being included as part of sensor system 306, an input device 160 may include a computing device separate from the vehicle. For example, input device 160 may include a remote device that may include a smart device or portable personal computing device such as a smart phone, palm pilot, laptop, or any smart wearable device such as a smart watch. In examples, a lumbar adjustment application 344 or like logic instructions may be stored on the smart device, portable personal computing device, or remote computer configured to interact with command input system 342 stored at vehicle 302 and/or computing device(s) 330. In examples, where the input device 160 is a remote device, the lumbar adjustment application 344 or like logic instructions stored on input device 160 may also be configured to pair input device 160 to vehicle 302. Pairing may be accomplished based on proximity of the input device 160 to vehicle 302, entry of an identification code, selection of a vehicle, or any like means. In examples, pairing of an input device 160 to vehicle 302 may be accomplished via a vehicle application running at least in part on input device 160. In examples, the pairing may be automatic or require user input. In examples, a remote input device 160 may be configured to communicate with the vehicle system and/or computing device(s) 330 by a wired and/or wireless transmission configured to send and receive information and commands. In examples, the wireless transmission may be effectuated via network(s) 332 in the same manner as described for computing device(s) 330.

The communications connection(s) 310 may include physical and/or logical interfaces for connecting the vehicle computing device 304 to another computing device or a network, such as network(s) 332. For example, the communications connection(s) 310 may enable Wi-Fi-based communication, such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the vehicle 302 may include one or more drive modules 314. In some examples, the vehicle 302 may have a single drive module 314. In at least one example, if the vehicle 302 has multiple drive modules 314, individual drive modules 314 may be positioned on opposite ends of the vehicle 302 (e.g., the leading end and the rear, etc.). In at least one example, the drive module(s) 314 may include one or more sensor systems to detect conditions of the drive module(s) 314 and/or the surroundings of the vehicle 302. By way of example and not limitation, the sensor system(s) 306 may include one or more wheel encoders (e.g., rotary encoders) to sense rotation of the wheels (e.g., wheels 110 in FIG. 1) of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders may be unique to the drive module(s) 314. In some cases, the sensor system(s) on the drive module(s) 314 may overlap or supplement corresponding systems of the vehicle 302 (e.g., sensor system(s) 306).

The stopped here drive module(s) 314 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 314 may include a drive module controller, which may receive and preprocess data from the sensor system(s) 306 and to control operation of the various vehicle systems. In some examples, the drive module controller may include one or more processors and memory communicatively coupled with the one or more processors. The memory may store one or more modules to perform various functionalities of the drive module(s) 314. Furthermore, the drive module(s) 314 also include one or more communication connection(s) that enable communication by the respective drive module with one or more other local or remote computing device(s).

In at least one example, the direct connection 312 may provide a physical interface to couple the one or more drive module(s) 314 with the body of the vehicle 302. For example, the direct connection 312 may allow the transfer of energy, fluids, air, data, etc. between the drive module(s) 314 and the vehicle 302. In some examples, the direct connection 312 may further releasably secure the drive module(s) 314 to the body of the vehicle 302.

In at least one example, the localization component 320, perception component 322, the planning component 324, and/or the multipurpose seatback bladder system 120 may process sensor data, as described above, and may send their respective outputs, over the one or more network(s) 332, to one or more computing device(s) 330. In at least one example, the localization component 320, the perception component 322, the planning component 324, and/or the multipurpose seatback bladder system 120 may send their respective outputs to the one or more computing device(s) 330 at a particular frequency, after a lapse of a predetermined period of time, in near real-time, etc.

The processor(s) 316 of the vehicle 302 and/or the processor(s) 336 of the computing device(s) 330 may include any suitable processor capable of executing instructions to process data and perform operations as described herein. By way of example and not limitation, the processor(s) 316 and 336 may include one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 318 and 334 are examples of non-transitory computer-readable media. The memory 318 and 334 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some examples, for example as shown in FIG. 3, the multipurpose seatback bladder system 120 may include the seat actuator system 200 including the actuator controller 202 configured to control the seat actuator 204. In examples, multipurpose seatback bladder system 120 and/or actuator system 200 may be configured to carry out the operations described. As shown in FIG. 3, the seat actuator system 200 and a seatbelt system 140 may be associated with one or more of the vehicle computing device 304 on board the vehicle 302 or the remote computing device(s) 330.

It should be noted that while FIG. 3 is illustrated as a distributed system, in alternative examples, components of the vehicle 302 may be associated with the computing device(s) 330, and/or components of the computing device(s) 330 may be associated with the vehicle 302. That is, the vehicle 302 may perform one or more of the functions associated with the computing device(s) 330 and vice versa.

In various implementations, the parameter values and other data illustrated herein may be included in one or more data stores and may be combined with other information not described or may be partitioned differently into more, fewer, or different data structures. In some implementations, data stores may be physically located in one memory or may be distributed among two or more memories.

Those skilled in the art will appreciate that the example architecture of system 300 shown in FIG. 3 is merely illustrative and are not intended to limit the scope of the present disclosure. In particular, the computing system and devices may include any combination of hardware or software that can perform the indicated functions, including computers, network devices, internet appliances, tablet computers, PDAs, wireless phones, pagers, etc. The architecture of system 300 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated architecture of system 300. Some or all of the system components or data structures may also be stored (e.g., as instructions or structured data) on a non-transitory, computer-accessible medium or a portable article to be read by an appropriate drive, various examples of which are described above. In some implementations, instructions stored on a computer-accessible medium separate from the architecture of system 300 may be transmitted to the architecture of system 300 via transmission media or signals such as electrical, electromagnetic, or digital signals, conveyed via a communication medium such as a wireless link. Various implementations may further include receiving, sending, or storing instructions and/or data implemented in accordance with the foregoing description on a computer-accessible medium. Accordingly, the techniques described herein may be practiced with other control system configurations. Additional information about the operations of the modules of the vehicle 102 is discussed below.

Figure 4:
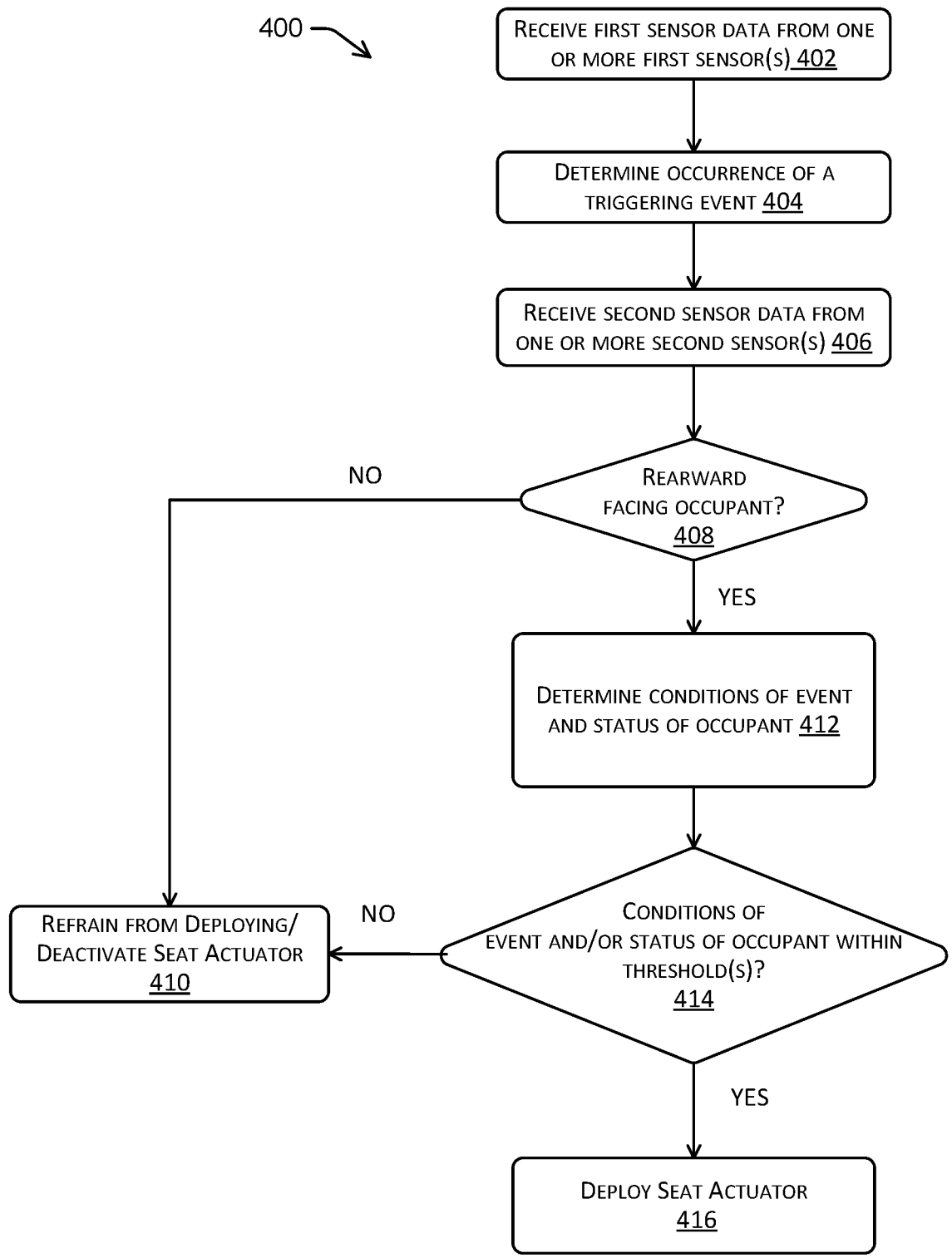
FIG. 4 is a flow diagram of an example process for protecting an occupant of a vehicle in case of an event using a multipurpose seatback bladder system.
Figure 5:
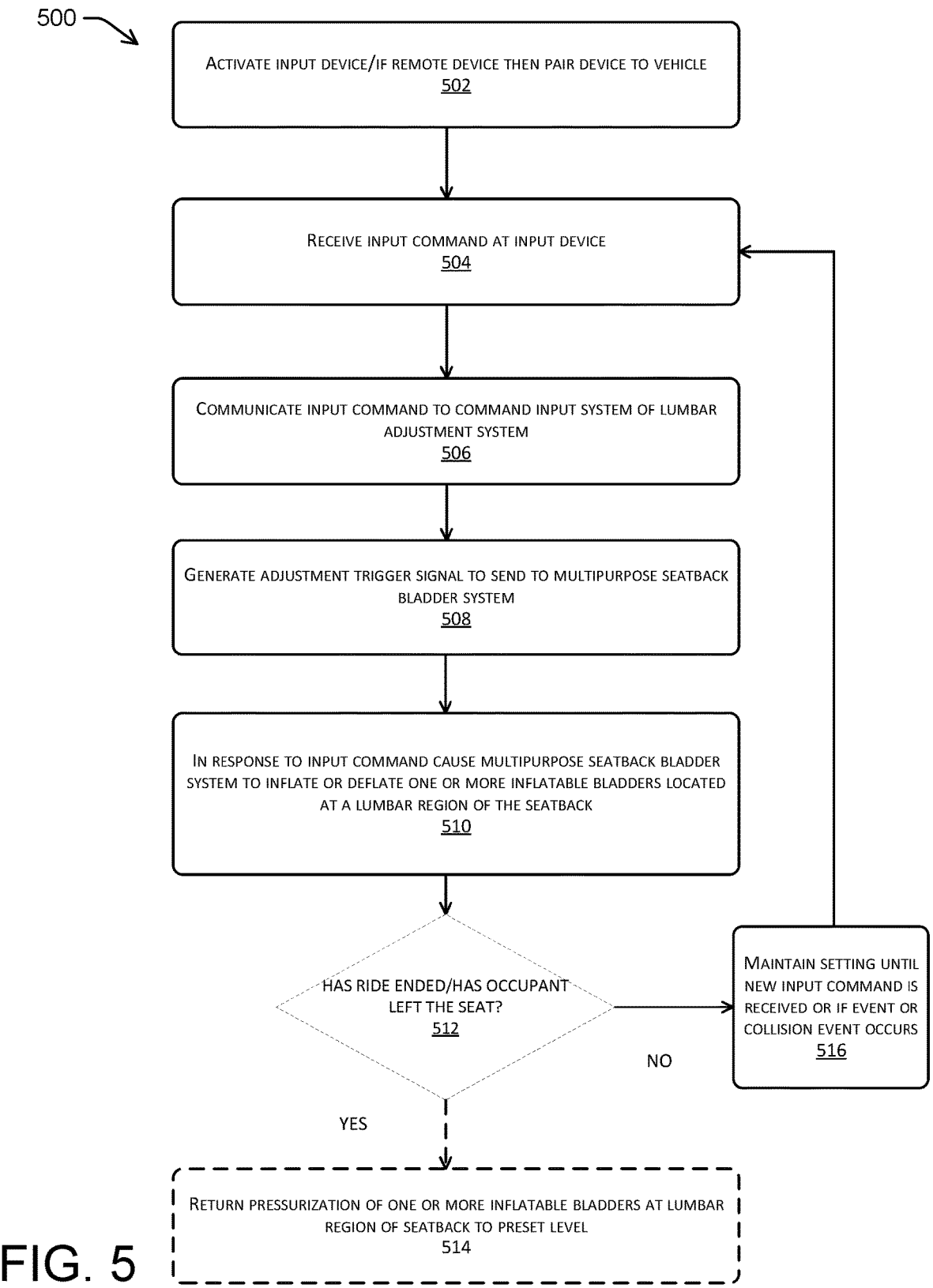
FIG. 5 is a flow diagram of an example process for adjusting a lumbar support during normal vehicle operation using a multipurpose seatback bladder system.
Figure 6:
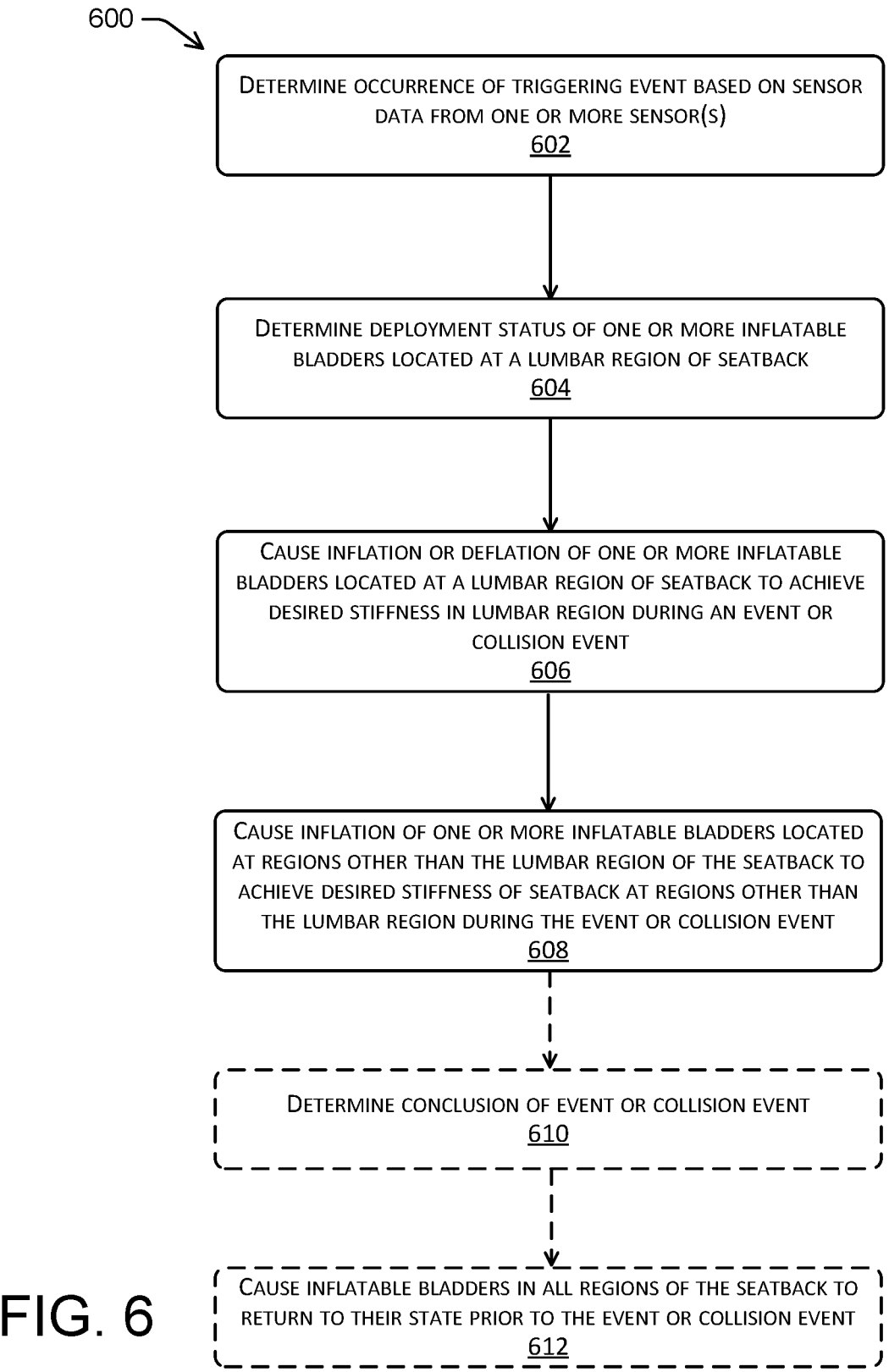
FIG. 6 is a flow diagram for an example process of coordinating pressurization of one or more inflatable bladders at a lumbar region with the pressurization of one or more inflatable bladders at other regions of a seatback in case of an event using a multipurpose seatback bladder system.

FIGS. 4-6 are flow diagrams of example processes illustrated as a collection of blocks in a logical flow graph, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 4 is a flow diagram of an example process 400 for protecting an occupant of a vehicle in case of an event using the multipurpose seatback bladder system 120 as described herein. At 402, the example process 400 may include receiving at 402 first sensor data from one or more sensors that may be used at 404 to determine eat least one of a change in velocity of a vehicle, a predicted change in velocity of the vehicle, a collision involving the vehicle, or a predicted collision involving the vehicle. A trigger signal to deploy seat actuator 204 may be set in conjunction with the determination of at least one of a change in velocity of a vehicle, a predicted change in velocity of the vehicle, a collision involving the vehicle, or a predicted collision involving the vehicle.

Optionally, operations 406 to 414, additional data from one or more sensors can be received and analyzed to confirm deployment and/or control deployment as discussed earlier. The information used during these operations may include occupant information, event information, or other data that can be used as deployment parameter. In examples where deployment occurs, the additional information may be used to determine deployment control such as, for example, pressurization level of one or more inflatable bladders 206, depressurization rate, selective and/or delayed deployment of an inflatable bladder 206, or any other previously described control.

For example, the information from operation 406 may be used at operation 408 to determine if a rearward facing occupant is present. As used herein, a rearward facing occupant can be an occupant that is seated facing a direction opposite the direction of travel and/or in the event of a collision or predicted collision, an occupant facing a direction opposite the direction in which the vehicle is colliding or predicted to collide with an object. As described earlier, this may include, for example, receiving an occupant presence signal indicative of a presence of an occupant in a seat, and determining, based at least in part on the occupant presence signal, whether an occupant is present in a seat. For example, an object classification system and/or other portions of vehicle systems may generate signals indicative of whether an occupant is present in a seat of the vehicle, and in some examples, one or more signals indicative of the seat in which the occupant is seated. The process 400, in some examples, may include receiving a direction signal indicative of a direction of travel of the vehicle. Based at least in part on one or more of the occupant presence signal or the direction signal, the process may be configured to determine whether the occupant is facing rearward. If at 408 it is determined that a rearward facing occupant is absent, the process may determine at 410 to not deploy the seat actuator 204. In examples, if at 408 it is determined that a rearward facing occupant is present, the process may proceed to assess additional information. For example, at operation 412, additional information may be evaluated to determine the event type, i.e. a velocity change, a collision, a predicted velocity change, a predicted collision, as well as additional information if available such as degree of velocity change, level of collision impact, direction of impact and like information. Final determination of deployment and/or deployment control can be based on the additional information at operation 414.

As discussed earlier, deployment determination and/or deployment control can be based on one or more parameters or thresholds reflecting one or more of occupant presence, type of event reflecting the triggering event, occupant parameters such as size, position, weight, or any combination thereof or with any of the previously mentioned parameters. For example, if at operation 414 it is determined that the event is minor, and thus for example below a threshold value as previously described, then deployment may not be necessary even if a collision event is occurring and the process moves to operation 410. If on the other hand, at operation 414 it is determined that the event is above a threshold, then seat actuator 204 may be deployed.

If it is determined that deployment is necessary, then at operation 416 actuator controller 202 may cause seat actuator 204 to deploy by engaging one or more expansion devices 208 (e.g., 208a, 208b, and 208c) to pressurize or inflate one or more inflatable bladders 206 in seatback 124. In so doing, the deployed inflatable bladders 206 compress at least in part one or more layers or sections of comfort foam or comfort material and increase the stiffness of at least a portion of a seatback during a collision event.

In some examples, at 416, the example process 400 may cause a reaction force from the seatback against at least a portion of the back of the occupant to increase from a minimal reaction force to a first reaction force more quickly. For example, the seatback may exhibit a reaction force F against the at least a portion of the back of the occupant that increases from a minimal reaction force (e.g., a zero reaction force F) to a first reaction force without a delay that could otherwise be caused while the comfort foam or comfort material compresses.

In some examples, the one or more inflatable bladders 206 are allowed to return to a stowed state or may be actively deflated to return to a stowed state at 410 after deployment, and/or after cessation of the triggering signal is detected or determined.

FIG. 5 is a flow diagram of an example process 500 for lumbar adjustment of seatback 124 during normal vehicle operation using the multipurpose seatback bladder system 120 as described herein. In examples, a 502 an input device 160 is activated and/or paired with vehicle 302. In examples, the input device 160 may be activated to receive input command in response to the system of vehicle 302 sensing that an occupant is seated at seat 106. In examples, input device 160 may be integrated in vehicle 302 and/or be a remote device.

In examples, where input device 160 is a remote device, it may include a lumbar adjustment application 344 or like logic instructions to interact with the command input system 342 of vehicle 302 and/or computing device(s) 330. In examples, the lumbar adjustment application 344 or like logic instructions on a remote input device 160 may be configured to pair the application with the system of the vehicle in which lumbar adjustment is to be effectuated. In examples, the lumbar adjustment application 344 or like logic instructions on a remote input device 160 may be configured to recognize the vehicle system of a particular vehicle 302 and/or allow a user to select a particular seat 106 within vehicle 302 for which to adjust the lumbar support. The recognition and pairing may be carried out automatically based on proximity of the remote input device 160 to the vehicle, by entering a code, by allowing selection of a vehicle identification from a displayed list, or any combination thereof. In examples, where input device 160 is integrated in vehicle 302 pairing may not be required.

In examples, at 504 an input command may be received at input device 160. In examples, the input command may be entered by an occupant 104 of seat 106. In examples, the input command may be received via the lumbar adjustment application 344 or like logic instructions on a remote input device 160. In examples, the command may be received via a keyboard, touchscreen, voice command, or any like means. In examples, input device 160 may include a display providing possible adjustments that may be selected and an input command may be received based on the selection of one of the displayed possibilities. In examples, the lumbar adjustment application 344 or like logic instructions stored on a input device 160 may be configured to store a preferred setting for one or more occupants so as to allow quick and/or automatic selection and implementation of the lumbar adjustment what the a recognized occupant occupies the seat 106. In examples, the adjustment command may include a request of a level of pressure in one or more inflatable bladders located at or proximate to lumbar region 220 of seatback 124. In examples, where two or more inflatable bladders are located at or proximate to lumbar region 220 of seatback 124, as previously described for example with reference to FIG. 2C, the system may allow for independent pressurization selection and adjustment of each of the inflatable bladders 206L. In this manner, lumbar support may be adjusted in terms of degree as well as in terms of location across the lumbar region 220 of seatback 124. For example, a first occupant may desire lumbar support at a higher or lower location than a second occupant. In such scenario, a multipurpose seatback bladder system 120 as illustrated in FIG. 2C having multiple, independently controllable inflatable bladders 206L in the lumbar region 220 of seatback 124 may allow for the selection of lumbar adjustment at different heights of seatback 124.

In examples, at 506, upon receiving an input command to adjust the lumbar support for a seatback 124, input device 160 may communicate via wired or wireless communication the command to command input system 342 of lumbar support adjustment system 340.

In examples, at 508, in response to the input command a corresponding adjustment trigger signal is generated at lumbar support adjustment system 340 that is then received by the multipurpose seatback bladder system 120.

In examples, at 510, in response to receiving the adjustment trigger signal, the multipurpose seatback bladder system 120 may cause deployment of actuator system 200 and/or actuator controller 202 and ultimately of seat actuator 204 to pressurize and/or depressurize one or more inflatable bladders 206 located at lumbar region 220 of seatback 124 of seat 106 occupied by occupant 104.

In examples, the pressurization of the one or more inflatable bladders 206 in lumbar region 220 of seatback 124 may remain until an addition input command is entered at input device 160 and/or an event occurs as shown at 516.

Optionally, in examples, at 512 the system may determine if the ride has ended and/or if the occupant of seat 106 has left. In examples, if it is detected that the ride has ended and/or that the occupant 104 has left seat 106, then at 514, the one or more inflatable bladders 206 in lumbar region 220 may optionally be caused by multipurpose bladder seatback system to return to a depressurized and or predetermined pressure level.

FIG. 6 is a flow diagram of an example process 600 for coordinating the adjustment of the pressurization of one or more inflatable bladders 206 in or proximate to the lumbar region 220 of seatback 124 with the pressurization of one or more inflatable bladders at other regions of seatback 124, such as the thoracic region 222 and pelvic region 218, in case a triggering event signal is generated when using the multipurpose seatback bladder system 120 as described herein. In examples, during normal vehicle operation the pressurization of one or more inflatable bladders located at or near lumbar region 220 of seatback 124 may be adjusted as previously discussed. In examples, at 602 the vehicle system determines the occurrence of an event as previously described based on sensor data.

In response to a triggering event signal received by the multipurpose seatback bladder system because of the determined event, the multipurpose seatback bladder system may, at 604, determine a deployment status of one or more inflatable bladders at or proximate to the lumbar region 220 of seatback 124. In examples, deployment status may be reflected in seat actuator system 200 and/or actuator controller 202 based on previous action taken by seat actuator 204 in adjusting the lumbar support at lumbar region 220 of seatback 124. In examples, one or more sensors 306, including for example a pressure sensor, may be associated with one or more inflatable bladders provided at lumbar region 220 of seatback 124 to sense the pressurization of any such inflatable bladder. Any combination of these means to determine the deployment status of one or more inflatable bladders at or proximate to the lumbar region 220 of seatback 124 may be employed.

In examples, at 606, the multipurpose seatback bladder system may cause the pressurization of one or more inflatable bladders at or proximate to lumbar region 220 of seatback 124 to be adjusted to achieve a desired stiffness of seatback 124 at the lumbar region when the vehicle is experiencing an event.

In examples, at 608, the multipurpose seatback bladder system may cause deployment of one or more inflatable bladders at other regions of seatback 124, for example at pelvic region and at thoracic region 222 to also achieve desired seatback stiffness at these regions when the vehicle is experiencing an event. In examples, the process 606 and 608 may be performed simultaneously, concurrently, or consecutively.

By deployment and/or pressurization adjustment of the inflatable bladders at 606 and 608, the multipurpose seatback bladder system may be able to cause a stiffness of seatback 124 across one or more regions of seatback 124 that may expedite the engagement of energy absorption material of seatback 124 and thus decrease the reactionary force against occupant 104 and improve safety.

Optionally, at 610 the vehicle may determine when the event is has concluded. Once the event is concluded, at 612, the multipurpose seatback bladder system may optionally return the one or more inflatable bladders provided throughout seatback 124 to the state they were in prior to the event and/or other predetermined initial state. For examples, one or more inflatable bladders provided at regions other than the lumbar region of seatback 124 may be returned to a deflated, stowed state, and one or more inflatable bladders located at or proximate to the lumbar region of 124 may be returned to the pre-event or pre-collision event state and/or an initial predetermined level of pressurization.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, mobile telephone devices, tablet computing devices, special-purposed hardware devices, network appliances, and the like.

Based on the foregoing, it should be appreciated that technologies for deploying an multipurpose seatback bladder system have been presented herein. Moreover, although the subject matter presented herein has been described in language specific to computer structural features, methodological acts, and computer readable media, it is to be understood that the subject matter defined in the appended claims is not necessarily limited to the specific features, acts, or media described herein. Rather, the specific features, acts, and media are disclosed as example forms of implementing the subject matter recited in the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present disclosure, which is set forth in the following claims.

Example Clauses:

A. A vehicle including a seat including a seat base configured to support at least a portion of weight of an occupant of the seat; a seatback associated with the seat base and configured to provide support to a back of the occupant; and a multipurpose seatback bladder system integrated in the seatback, the multipurpose seatback bladder system including: two or more inflatable bladders located in at least a portion of the seatback; a seat actuator configured to pressurize or depressurize the two or more inflatable bladders; and an actuator controller in communication with the seat actuator and configured to: cause, based at least in part on a triggering event signal indicative of one or more of a change in velocity of the vehicle, a predicted change in velocity of the vehicle, a collision, or a predicted collision, the seat actuator to modify a stiffness of the portion of the seatback by deploying the two or more inflatable bladders; and cause, based at least in part on an lumbar adjustment trigger signal indicative of a command input, the seat actuator to modify a lumbar support at a portion of the seatback by independently adjusting a pressure of at least one of the two or more inflatable bladders.

B. The vehicle of paragraph A, wherein the triggering event signal is responsive to a collision or a predicted collision with an object located behind the seatback.

C. The vehicle of paragraph A or B, wherein the actuator controller is further configured to: receive a seating position of an occupant; and receive a direction of travel of the vehicle, wherein causing the seat actuator to modify the stiffness of the portion of the seatback is further based at least in part on one or more of the seating position or the direction of travel.

D. The vehicle of any one of paragraphs A-C, wherein the portion of the seatback includes a first portion facing the back of the occupant, the first portion including a first material, and wherein the seatback further includes: a second portion, opposite the first portion, the second portion including a second material, wherein the two or more inflatable bladders are located between the first portion and the second portion.

E. The vehicle of paragraph D, wherein the first material comprises an elastomeric foam and the second material is configured to crush in plastic deformation under a threshold load.

F. The vehicle of any one of paragraphs A-E, wherein the seat actuator includes: one or more expansion devices in flow communication with the two or more inflatable bladders configured to cause the two or more inflatable bladders to expand from a stowed state to a deployed state.

G. The vehicle of any one of paragraphs A-F, wherein the two or more inflatable bladders are independently operable, and wherein a first inflatable bladder of the two or more inflatable bladders is at a first location of the seatback and a second inflatable bladder of the two or more inflatable bladders is at a second location, different from the first location, of the seatback, wherein at least one of the first location or the second location is a lumbar region of the seatback.

H. The vehicle of any one of paragraphs A-G, wherein the two or more inflatable bladders include three or more inflatable bladders with at least two inflatable bladders of the three or more inflatable bladders being located in a lumbar region of the seatback.

I. The vehicle of any one of paragraphs A-H, wherein the two or more inflatable bladders are separated by a seam configured to open when a pressure inside one inflatable bladder delineated by the seam reaches a threshold.

J. The vehicle of any one of paragraphs A-I, wherein at least a first inflatable bladder of the two or more inflatable bladders is contained within at least a second inflatable bladder of the two or more inflatable bladders.

K. A multipurpose seatback bladder system for a vehicle, the multipurpose seatback bladder system including: a seatback configured to provide support to a back of an occupant when seated at a seat coupled to the vehicle; one or more inflatable bladders inside at portion of the seatback; a seat actuator configured to deploy the one or more inflatable bladders; and an actuator controller in communication with the seat actuator and configured to: cause, based on a triggering event signal indicative of one or more of a change in velocity of the vehicle, a predicted change in velocity of the vehicle, a collision, or a predicted collision, the seat actuator to modify a stiffness of the portion of the seatback by pressurizing the one or more inflatable bladders; and cause, based on a lumbar adjustment trigger signal, an independent adjustment of a pressure inside at least one of the one or more inflatable bladders to modify a lumbar support of the seatback.

L. The multipurpose seatback bladder system of paragraph K, wherein the seat actuator includes: one or more expansion devices in flow communication with the one or more inflatable bladders and configured to cause at least one of the one or more inflatable bladders to be pressurized.

M. The multipurpose seatback bladder system of paragraphs K or L, wherein the portion of the seatback comprises a first portion facing the back of the occupant, the first portion comprising an elastomeric material, and wherein the seatback further includes: a second portion, opposite the first portion, configured to crush in plastic deformation under a threshold load, wherein the one or more inflatable bladders are located between the first portion and the second portion and are configured to compress the elastomeric material upon expanding.

N. One or more non-transitory computer-readable media storing instructions that, when executed by one or more processors, perform operations for enhancing rider experience in a vehicle, the operations including: enhancing occupant safety by: predicting an event indicative of at least one of a change in velocity of the vehicle, a predicted change in velocity of the vehicle, a collision, or a predicted collision; causing, based on the predicting of the event, transmission of a triggering event signal to a multipurpose seatback bladder system integrated in a seatback of a vehicle seat; causing, based at least in part on the triggering event signal, the multipurpose seatback bladder system to change a stiffness of a portion of a seatback that faces at least a portion of a back of an occupant from a first stiffness to a second stiffness greater than the first stiffness by pressurizing one or more inflatable bladders; and enhancing occupant comfort by: receiving a lumbar adjustment command input from an input device; and causing, based at least in part on the lumbar adjustment command, the multipurpose seatback bladder system to independently modify a pressurization of at least one inflatable bladder of the one or more inflatable bladders, wherein the at least one inflatable bladder is located at a lumbar region of the seatback.

O. The one or more non-transitory computer-readable media of paragraph N, wherein the one or more inflatable bladders are located in an internal portion of the seatback.

P. The one or more non-transitory computer-readable media of paragraph N or O, wherein pressurizing the one or more inflatable bladders and independently modifying the pressurization of the at least one inflatable bladder located at the lumbar region of the seatback comprises activating one or more expansion devices.

Q. The one or more non-transitory computer-readable media of any one of paragraphs N-P, wherein causing the multipurpose seatback bladder system to change the stiffness of the portion of the seatback includes: pressurizing at least a first inflatable bladder of the one or more inflatable bladders, the first inflatable bladder being located at a first location inside the seatback; and pressurizing at least a second inflatable bladder of the one or more inflatable bladders, the second inflatable bladder being located at a second location inside the seatback, the second location being different from the first location.

R. The one or more non-transitory computer-readable media of any one of paragraphs N-Q, wherein the input device comprises a computing device separate from the vehicle.

S. The one or more non-transitory computer-readable media of any one of paragraphs N-R, wherein independently modifying the pressurization of at least one inflatable bladder of the one or more inflatable bladders in response to the lumbar adjustment trigger signal includes at least one of reversibly pressurizing or reversibly depressurizing the at least one inflatable bladder.

T. The one or more non-transitory computer-readable media of any one of paragraphs N-S, wherein the lumbar adjustment command includes an adjustment of a degree of lumbar support, an adjustment of a height of the lumbar support, or both.

While the example clauses described above are described with respect to particular implementations, it should be understood that, in the context of this document, the content of the example clauses can be implemented via a method, device, system, a computer-readable medium, and/or another implementation. Additionally, any of examples A-T may be implemented alone or in combination with any other one or more of the examples A-T.

What is claimed is:

1. A vehicle comprising:
a seat comprising:
a seat base configured to support at least a portion of weight of an occupant of the seat;
a seatback associated with the seat base and configured to provide support to a back of the occupant; and
a multipurpose seatback bladder system integrated in the seatback, the multipurpose seatback bladder system comprising:
two or more inflatable bladders located in at least a portion of the seatback;
a seat actuator configured to pressurize or depressurize the two or more inflatable bladders; and
an actuator controller in communication with the seat actuator and configured to:
receive a seating position of an occupant;
receive a direction of travel of the vehicle;
cause, based at least in part on one or more of the seating position of the occupant or the direction of travel of the vehicle, and a triggering event signal indicative of one or more of a change in velocity of the vehicle, a predicted change in velocity of the vehicle, a collision, or a predicted collision, the seat actuator to modify a stiffness of the portion of the seatback by deploying the two or more inflatable bladders; and
cause, based at least in part on a lumbar adjustment trigger signal indicative of a command input, the seat actuator to modify a lumbar support at a portion of the seatback by independently adjusting a pressure of at least one of the two or more inflatable bladders.

2. The vehicle of claim 1, wherein the triggering event signal is responsive to a collision or a predicted collision with an object located behind the seatback.

3. The vehicle of claim 1, wherein the portion of the seatback comprises a first portion facing the back of the occupant, the first portion comprising a first material, and wherein the seatback further comprises:
a second portion, opposite the first portion, the second portion comprising a second material,
wherein the two or more inflatable bladders are located between the first portion and the second portion.

4. The vehicle of claim 3, wherein the first material comprises an elastomeric foam and the second material is configured to crush in plastic deformation under a threshold load.

5. The vehicle of claim 1, wherein the seat actuator comprises:
one or more expansion devices in flow communication with the two or more inflatable bladders configured to cause the two or more inflatable bladders to expand from a stowed state to a deployed state.

6. The vehicle of claim 1, wherein the two or more inflatable bladders are independently operable, and wherein a first inflatable bladder of the two or more inflatable bladders is at a first location of the seatback and a second inflatable bladder of the two or more inflatable bladders is at a second location, different from the first location, of the seatback,
wherein at least one of the first location or the second location is a lumbar region of the seatback.

7. The vehicle of claim 1, wherein the two or more inflatable bladders comprise three or more inflatable bladders with at least two inflatable bladders of the three or more inflatable bladders being located in a lumbar region of the seatback.

8. The vehicle of claim 1, wherein the two or more inflatable bladders are separated by a seam configured to open when a pressure inside one inflatable bladder delineated by the seam reaches a threshold.

9. The vehicle of claim 1, wherein at least a first inflatable bladder of the two or more inflatable bladders is contained within at least a second inflatable bladder of the two or more inflatable bladders.

10. A multipurpose seatback bladder system for a vehicle, the multipurpose seatback bladder system comprising:
a seatback configured to provide support to a back of an occupant when seated at a seat coupled to the vehicle;
one or more inflatable bladders inside at portion of the seatback, wherein the one or more inflatable bladders include a first inflatable bladder located at a lumbar region of the seatback and a second inflatable bladder located above the lumbar region;
a seat actuator configured to deploy the one or more inflatable bladders; and
an actuator controller in communication with the seat actuator and configured to:
cause, based on a triggering event signal indicative of one or more of a change in velocity of the vehicle, a predicted change in velocity of the vehicle, a collision, or a predicted collision, the seat actuator to modify a stiffness of the portion of the seatback by pressurizing the one or more inflatable bladders; and cause, based on a lumbar adjustment trigger signal, an independent adjustment of a pressure inside at least one of the one or more inflatable bladders to modify a lumbar support of the seatback.

11. The multipurpose seatback bladder system of claim 10, wherein the seat actuator comprises:

one or more expansion devices in flow communication with the one or more inflatable bladders and configured to cause at least one of the one or more inflatable bladders to be pressurized.

12. The multipurpose seatback bladder system of claim 10, wherein the portion of the seatback comprises a first portion facing the back of the occupant, the first portion comprising an elastomeric material, and wherein the seatback further comprises:

a second portion, opposite the first portion, configured to crush in plastic deformation under a threshold load, wherein the one or more inflatable bladders are located between the first portion and the second portion and are configured to compress the elastomeric material upon expanding.

13. One or more non-transitory computer-readable media storing instructions that, when executed by one or more processors, perform operations for enhancing rider experience in a vehicle, the operations comprising:

enhancing occupant safety by:

predicting an event indicative of at least one of a change in velocity of the vehicle, a predicted change in velocity of the vehicle, a collision, or a predicted collision;

causing, based on the predicting of the event, transmission of a triggering event signal to a multipurpose seatback bladder system integrated in a seatback of a vehicle seat, wherein the multipurpose seatback bladder system includes a first inflatable bladder located at a lumbar region of the seatback and a second inflatable bladder located above the lumbar region;

causing, based at least in part on the triggering event signal, the multipurpose seatback bladder system to change a stiffness of a portion of a seatback that faces at least a portion of a back of an occupant from a first stiffness to a second stiffness greater than the first stiffness by pressurizing the second inflatable bladder; and enhancing occupant comfort by:

receiving a lumbar adjustment command input from an input device; and causing, based at least in part on the lumbar adjustment command, the multipurpose seatback bladder system to independently modify a pressurization of the first inflatable bladder located at the lumbar region of the seatback.

14. The one or more non-transitory computer-readable media of claim 13, wherein the first inflatable bladder and the second inflatable bladder are located in an internal portion of the seatback.

15. The one or more non-transitory computer-readable media of claim 13, wherein pressurizing the first inflatable bladder and the second inflatable bladder and independently modifying the pressurization of the first inflatable bladder located at the lumbar region of the seatback comprises activating one or more expansion devices.

16. The one or more non-transitory computer-readable media of claim 13, wherein causing the multipurpose seatback bladder system to change the stiffness of the portion of the seatback comprises:

pressurizing at least the first inflatable bladder of the one or more inflatable bladders; and pressurizing at least the second inflatable bladder of the one or more inflatable bladders.

17. The one or more non-transitory computer-readable media of claim 13, wherein the input device comprises a computing device separate from the vehicle.

18. The one or more non-transitory computer-readable media of claim 13, wherein independently modifying the pressurization of the first inflatable bladder in response to the lumbar adjustment trigger signal comprises at least one of reversibly pressurizing or reversibly depressurizing the first inflatable bladder.

19. The one or more non-transitory computer-readable media of claim 13, wherein the lumbar adjustment command comprises an adjustment of a degree of lumbar support, an adjustment of a height of the lumbar support, or both.

* * * * *